(12) United States Patent
Carroll et al.

(10) Patent No.: US 10,834,958 B2
(45) Date of Patent: *Nov. 17, 2020

(54) FIBER-WRAPPED SMOKELESS TOBACCO PRODUCT

(71) Applicant: Altria Client Services LLC, Richmond, VA (US)

(72) Inventors: Andrew Nathan Carroll, Chester, VA (US); Shannon Maxwell Black, Richmond, VA (US); Yan Helen Sun, Midlothian, VA (US); William J. Burke, Nashville, TN (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,095

(22) Filed: Apr. 10, 2019

(65) Prior Publication Data

US 2019/0297935 A1    Oct. 3, 2019

Related U.S. Application Data

(60) Continuation of application No. 15/688,114, filed on Aug. 28, 2017, now Pat. No. 10,258,076, which is a
(Continued)

(51) Int. Cl.
*A24B 15/18* (2006.01)
*A24B 3/14* (2006.01)
(Continued)

(52) U.S. Cl.
CPC .............. *A24B 15/186* (2013.01); *A24B 3/14* (2013.01); *A24B 13/00* (2013.01); *A24B 15/14* (2013.01);
(Continued)

(58) Field of Classification Search
CPC .......... A24B 3/14; A24B 15/186; A24F 23/02
See application file for complete search history.

(56) References Cited

U.S. PATENT DOCUMENTS

| 1,684,421 A | 9/1928 | Thompson |
| 2,580,609 A | 1/1952 | Schur et al. |

(Continued)

FOREIGN PATENT DOCUMENTS

| DE | 10346649 A1 | 5/2005 |
| EP | 2449894 A1 | 5/2012 |

(Continued)

OTHER PUBLICATIONS

U.S. Appl. No. 15/261,515, filed Sep. 9, 2016.
(Continued)

*Primary Examiner* — Anthony Calandra
(74) *Attorney, Agent, or Firm* — Harness, Dickey & Pierce, P.L.C.

(57) ABSTRACT

A fiber-wrapped smokeless tobacco product includes smokeless tobacco and a plurality of polymeric fibers surrounding the smokeless tobacco. The polymeric fibers can have a basis weight of 5 gsm or less and a diameter of less than 100 microns. In some cases, the polymeric fibers are melt-blown polymeric fibers. In some cases, the polymeric fibers are centrifugal force spun polymeric fibers. A method of preparing a fiber-wrapped smokeless tobacco product includes melt-blowing or centrifugal force spinning a plurality of polymeric fibers to create an polymer deposition zone and passing a body comprising smokeless tobacco through the polymer deposition zone. In some cases, an electrostatic charge can be applied to the plurality of polymeric fibers, the body, or a combination thereof. In some cases, a spin is applied to the body when passing through the polymer deposition zone.

20 Claims, 12 Drawing Sheets

Related U.S. Application Data continuation of application No. 15/207,168, filed on Jul. 11, 2016, now Pat. No. 9,763,473, which is a division of application No. 14/212,537, filed on Mar. 14, 2014, now Pat. No. 9,414,624.

(60) Provisional application No. 61/786,295, filed on Mar. 14, 2013.

(51) Int. Cl.

| | | |
|---|---|---|
| A24F 23/02 | (2006.01) | |
| A24B 13/00 | (2006.01) | |
| D01D 11/06 | (2006.01) | |
| D01D 5/18 | (2006.01) | |
| D01D 5/098 | (2006.01) | |
| D01D 5/00 | (2006.01) | |
| B65G 15/44 | (2006.01) | |
| B65G 51/02 | (2006.01) | |
| B65G 15/24 | (2006.01) | |
| A24B 15/28 | (2006.01) | |
| D04H 13/00 | (2006.01) | |
| A24B 15/14 | (2006.01) | |
| A24B 15/40 | (2006.01) | |
| B05B 13/02 | (2006.01) | |

(52) U.S. Cl.
CPC ............ *A24B 15/28* (2013.01); *A24B 15/283* (2013.01); *A24B 15/403* (2013.01); *A24F 23/02* (2013.01); *B05B 13/0221* (2013.01); *B65G 15/24* (2013.01); *B65G 15/44* (2013.01); *B65G 51/02* (2013.01); *D01D 5/0084* (2013.01); *D01D 5/0985* (2013.01); *D01D 5/18* (2013.01); *D01D 11/06* (2013.01); *D04H 13/00* (2013.01); *D04H 13/001* (2013.01)

(56) References Cited

U.S. PATENT DOCUMENTS

| | | | |
|---|---|---|---|
| 2,734,509 | A | 2/1956 | Jurgensen, Jr. |
| 4,084,627 | A | 4/1978 | Focke et al. |
| 4,090,521 | A | 5/1978 | Elsner |
| 4,360,328 | A | 11/1982 | Kassabian |
| 4,380,570 | A | 4/1983 | Schwarz |
| 4,516,590 | A | 5/1985 | Teng |
| 4,526,733 | A | 7/1985 | Lau |
| 4,528,993 | A | 7/1985 | Sensabaugh, Jr. et al. |
| 4,660,577 | A | 4/1987 | Sensabaugh et al. |
| 4,725,446 | A | 2/1988 | Forster |
| 4,848,373 | A | 7/1989 | Lenkey |
| 4,987,907 | A | 1/1991 | Townend |
| 5,059,435 | A | 10/1991 | Sloan et al. |
| 5,063,104 | A | 11/1991 | Robertson et al. |
| 5,146,955 | A | 9/1992 | Steiner et al. |
| 5,372,149 | A | 12/1994 | Roth et al. |
| 5,476,616 | A | 12/1995 | Schwarz |
| 5,528,993 | A | 6/1996 | Vincelli |
| 5,645,790 | A | 7/1997 | Schwarz et al. |
| 5,876,775 | A | 3/1999 | Behnke et al. |
| 6,013,223 | A | 1/2000 | Schwarz |
| 6,207,601 | B1 | 3/2001 | Maurer et al. |
| 6,455,030 | B2 | 9/2002 | Saito et al. |
| 6,709,623 | B2 | 3/2004 | Haynes et al. |
| 6,716,498 | B2 | 4/2004 | Curro et al. |
| 6,849,330 | B1 | 2/2005 | Morin et al. |
| 7,156,937 | B2 | 1/2007 | Provost et al. |
| 7,465,366 | B2 | 12/2008 | Provost et al. |
| 7,547,469 | B2 | 6/2009 | Provost et al. |
| 7,562,426 | B2 | 7/2009 | Barker et al. |
| 7,666,261 | B2 | 2/2010 | Bailey et al. |
| 7,718,556 | B2 | 5/2010 | Matsuda et al. |
| 7,810,507 | B2 | 10/2010 | Dube et al. |
| 10,039,309 | B2 | 8/2018 | Carroll et al. |
| 2004/0038022 | A1 | 2/2004 | Maugans et al. |
| 2004/0038790 | A1 | 2/2004 | Pehmoller et al. |
| 2004/0118421 | A1 | 6/2004 | Hodin et al. |
| 2004/0118422 | A1 | 6/2004 | Lundin et al. |
| 2004/0209540 | A1 | 10/2004 | Schwarz |
| 2005/0056956 | A1 | 3/2005 | Zhao et al. |
| 2005/0178398 | A1 | 8/2005 | Breslin et al. |
| 2005/0196580 | A1 | 9/2005 | Provost et al. |
| 2005/0196583 | A1 | 9/2005 | Provost et al. |
| 2005/0217092 | A1 | 10/2005 | Barker et al. |
| 2005/0244521 | A1 | 11/2005 | Strickland |
| 2006/0191458 | A1 | 8/2006 | George |
| 2006/0191548 | A1 | 8/2006 | Strickland et al. |
| 2006/0264130 | A1 | 11/2006 | Karles et al. |
| 2006/0292271 | A1 | 12/2006 | King |
| 2007/0261707 | A1 | 11/2007 | Winterson et al. |
| 2008/0209586 | A1 | 8/2008 | Nielsen et al. |
| 2008/0302682 | A1 | 12/2008 | Engstrom et al. |
| 2008/0305297 | A1 | 12/2008 | Barker et al. |
| 2008/0308115 | A1 | 12/2008 | Zimmermann |
| 2009/0133703 | A1 | 5/2009 | Strickland et al. |
| 2009/0203280 | A9 | 8/2009 | Provost et al. |
| 2009/0256277 | A1 | 10/2009 | Brown et al. |
| 2009/0258099 | A1 | 10/2009 | Brown et al. |
| 2009/0258562 | A1 | 10/2009 | Brown et al. |
| 2010/0018539 | A1 | 1/2010 | Brinkley et al. |
| 2010/0018882 | A1 | 1/2010 | St Charles |
| 2010/0170522 | A1 | 7/2010 | Sun et al. |
| 2010/0242978 | A1 | 9/2010 | Fuisz |
| 2010/0300465 | A1 | 12/2010 | Zimmermann |
| 2011/0036364 | A1 | 2/2011 | Pienemann et al. |
| 2011/0083688 | A1 | 4/2011 | Mishra et al. |
| 2011/0220130 | A1 | 9/2011 | Mua et al. |
| 2012/0024301 | A1 | 2/2012 | Carroll et al. |
| 2012/0031414 | A1 | 2/2012 | Atchley et al. |
| 2012/0031416 | A1 | 2/2012 | Atchley et al. |
| 2012/0103353 | A1 | 5/2012 | Sebastian et al. |
| 2013/0031414 | A1 | 1/2013 | Dhuse et al. |

FOREIGN PATENT DOCUMENTS

| | | |
|---|---|---|
| GB | 2373988 A | 10/2002 |
| WO | WO-05/046363 A2 | 5/2005 |
| WO | WO-2005/115180 A1 | 12/2005 |
| WO | WO-2008/015573 A2 | 2/2008 |
| WO | WO-2009/010878 A2 | 1/2009 |
| WO | WO-2009/048522 A1 | 4/2009 |
| WO | WO-2009/063010 A2 | 5/2009 |

OTHER PUBLICATIONS

U.S. Appl. No. 16/426,476, filed May 30, 2019.
Canadian Office Action for corresponding Application No. CA 2,905,063 dated Feb. 24, 2020 (5 pages).
Canadian Office Action for corresponding Application No. CA 2,905,069 dated Feb. 24, 2020 (8 pages).
Canadian Office Action for corresponding Application No. CA 2,905,059 dated Feb. 24, 2020 (5 pages).
United States Office Action for corresponding U.S. Appl. No. 16/426,476 dated Jul. 30, 2019.
Notice of Allowance for corresponding U.S. Appl. No. 16/426,476 dated Nov. 15, 2019, 9 pages.
European Office Action for corresponding Application No. 14717364.5-1105, dated Jun. 11, 2019.
Office Action for corresponding U.S. Appl. No. 15/688,114 dated Jul. 10, 2018.
Tso, Chapter 1 in Tobacco, Production, Chemistry and Technology, 1999, Davis & Nielsen, eds. Blackwell Publishing, Oxford.
Rydholm, Pulping Processes, Interscience Publishers, 1967, pp. 51-52.
International Search Report and Written Opinion in International Application No. PCT/US2014/028354, dated Jul. 10, 2014, 12 pages.
International Preliminary Report on Patentability in International Application No. PCT/US2014/028354, dated Sep. 24, 2015, 10 pages.

(56) References Cited

OTHER PUBLICATIONS

Making Cosmetics, Polysaccharides (Sugars, Gums) used in Cosmetics, downloaded online Oct. 29, 2015.
International Search Report and Written Opinion in International Application No. PCT/US2014/028325, dated Sep. 8, 2014, 12 pages.
International Preliminary Report on Patentability in International Application No. PCT/US2014/028325, dated Sep. 24, 2015, 10 pages.
International Search Report and Written Opinion in International Application No. PCT/US2014/028389, dated Aug. 4, 2014, 9 pages.
International Preliminary Report on Patentability in International Application PCT/US2014/028389, dated Sep. 24, 2015, 7 pages.
Nishida, Automatic Cotton Candy Machine (https://www.youtube.com/watch?v=T6MIAn4m8K0), Aug. 2006.
United States Office Action for corresponding U.S. Appl. No. 15/261,515 dated Feb. 11, 2019.
Notice of Allowance for U.S. Appl. No. 15/261,515 dated Aug. 21, 2019.
European Office Action for corresponding Application No. 14716186.3-1105, dated Apr. 15, 2020.
Canadian Office Action for corresponding Application No. CA 2,905,059 dated Sep. 22, 2020 (4 pages).
Canadian Office Action for corresponding Application No. CA 2,905,069 dated Sep. 23, 2020 (4 pages).
European Office Action for corresponding Application No. EP 14717364.5 dated Oct. 12, 2020 (3 pages).

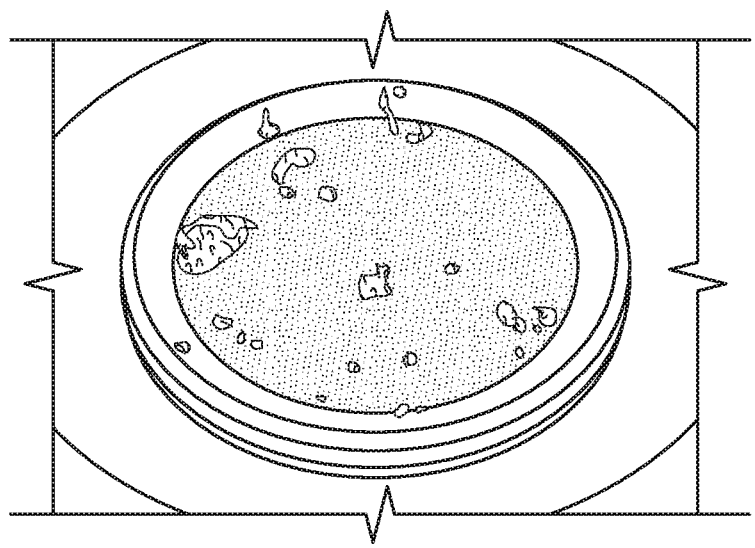
FIG. 6C
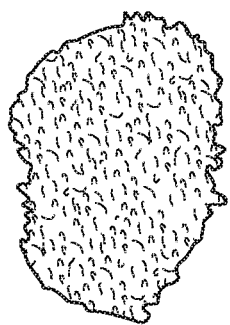 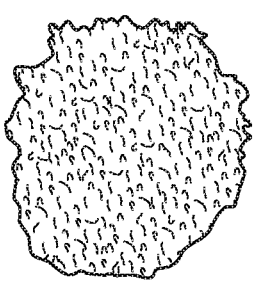 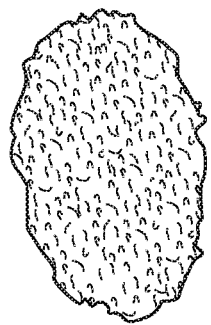
FIG. 7A  FIG. 7B  FIG. 7C

FIBER-WRAPPED SMOKELESS TOBACCO PRODUCT

CROSS REFERENCE TO RELATED APPLICATIONS

This application is a Continuation application of U.S. application Ser. No. 15/688,114, filed Aug. 28, 2017, which is a Continuation application of, and claims benefit of priority to, U.S. application Ser. No. 15/207,168 filed Jul. 11, 2016, which is a Divisional application of, and claims the benefit of priority under 35 U.S.C. § 121 to, U.S. application Ser. No. 14/212,537 filed Mar. 14, 2014, which claims the benefit of priority under 35 U.S.C. § 119(e) to U.S. Application No. 61/786,295 filed Mar. 14, 2013, the entire contents of each of which are incorporated herein by reference.

WORKING ENVIRONMENT

This disclosure generally relates to a smokeless tobacco product including wrapping of polymeric fibers and methods of making such products.

Smokeless tobacco is tobacco that is placed in the mouth and not combusted. There are various types of smokeless tobacco including: chewing tobacco, moist smokeless tobacco, snus, and dry snuff. Chewing tobacco is coarsely divided tobacco leaf that is typically packaged in a large pouch-like package and used in a plug or twist. Moist smokeless tobacco is a moist, more finely divided tobacco that is provided in loose form or in pouch form and is typically packaged in round cans and used as a pinch or in a pouch placed between a cheek and gum of an adult tobacco consumer. Snus is a heat treated smokeless tobacco. Dry snuff is finely ground tobacco that is placed in the mouth or used nasally. Smokeless Tobacco can be pouched in a fabric using a pouching machine where a supply of pouching material sealed around a deposit of smokeless tobacco material.

SUMMARY

A fiber-wrapped smokeless tobacco product includes smokeless tobacco and a plurality of polymeric fibers surrounding the smokeless tobacco. The polymeric fibers can have a basis weight of 30 grams per square meter (gsm) or less, 20 gsm or less, 10 gsm or less, or 5 gsm or less. The polymeric fibers can have diameters of less than 100 microns. In some cases, the polymeric fibers are melt-blown polymeric fibers. In some cases, the polymeric fibers are force-spun polymeric fibers. A method of preparing a fiber-wrapped smokeless tobacco product includes melt-blowing or centrifugal force spinning a plurality of polymeric fibers to create an polymer deposition zone and passing a body comprising smokeless tobacco through the polymer deposition zone. In some cases, an electrostatic charge can be applied to the plurality of polymeric fibers, the body, or a combination thereof. In some cases, a spin is applied to the body when passing through the polymer deposition zone. In some cases, the polymer fibers wrap and seal the body simultaneously.

The fiber-wrapped smokeless tobacco products provided herein provide a unique tactile and flavor experience to an adult tobacco consumer. In particular, the polymeric fibers can provide a smoother mouth texture and improved access to the smokeless tobacco, improved porosity, and improved fluid delivery as compared to a traditional pouching material, but still retain the smokeless tobacco. Moreover, the methods provided herein can result in a seamless wrapping of polymeric fibers, which can reduce mouth irritation. Furthermore, the polymeric fibers provided herein can be more elastic and can permit an adult tobacco consumer to chew/squeeze the fiber-wrapped smokeless tobacco product and mold the product into a desired shape (e.g., to comfortably conform the product between the cheek and gum). As compared to a typical pouch paper, the fiber wrappings provided herein can be softer, have a lower basis weight, and act as less of a selective membrane. The methods of forming pouched smokeless tobacco products and the fabrics provided herein are also described. In some cases, combinations of mouth-stable and mouth-dissolvable polymeric materials are combined to form a fiber-wrapped smokeless tobacco product that becomes looser when placed in a mouth of an adult tobacco consumer, yet remains generally cohesive. The polymeric fibers can also be a composite of multiple materials, which may include both mouth-stable and mouth-dissolvable materials.

The products and methods described herein can also be applied to other orally consumable plant materials in addition to smokeless tobacco. For example, some non-tobacco or "herbal" compositions have also been developed as an alternative to smokeless tobacco compositions. Non-tobacco products may include a number of different primary ingredients, including but not limited to, tea leaves, red clover, coconut flakes, mint leaves, citrus fiber, bamboo fiber, ginseng, apple, corn silk, grape leaf, and basil leaf. In some cases, such a non-tobacco smokeless product can further include tobacco extracts, which can result in a non-tobacco smokeless product providing a desirable mouth feel and flavor profile. In some cases, the tobacco extracts can be extracted from a cured and/or fermented tobacco by mixing the cured and/or fermented tobacco with water and/or other solvents and removing the non-soluble tobacco material. In some cases, the tobacco extracts can include nicotine. In some cases, a pouched non-tobacco product has an overall oven volatiles content of between 10 and 61 weight percent.

Unless otherwise defined, all technical and scientific terms used herein have the same meaning as commonly understood by one of ordinary skill in the art to which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

DESCRIPTION OF DRAWINGS

FIGS. 6A-6C depict the debris remaining in simulated masticator cell for the simulated masticator test of Figure for each tested fiber-wrapped smokeless tobacco product.

FIGS. 7A-7C depict fiber-wrapped smokeless tobacco products after the simulated masticator test of FIG. 5.

Like reference symbols in the various drawings indicate like elements.

DETAILED DESCRIPTION

Figure 1A:
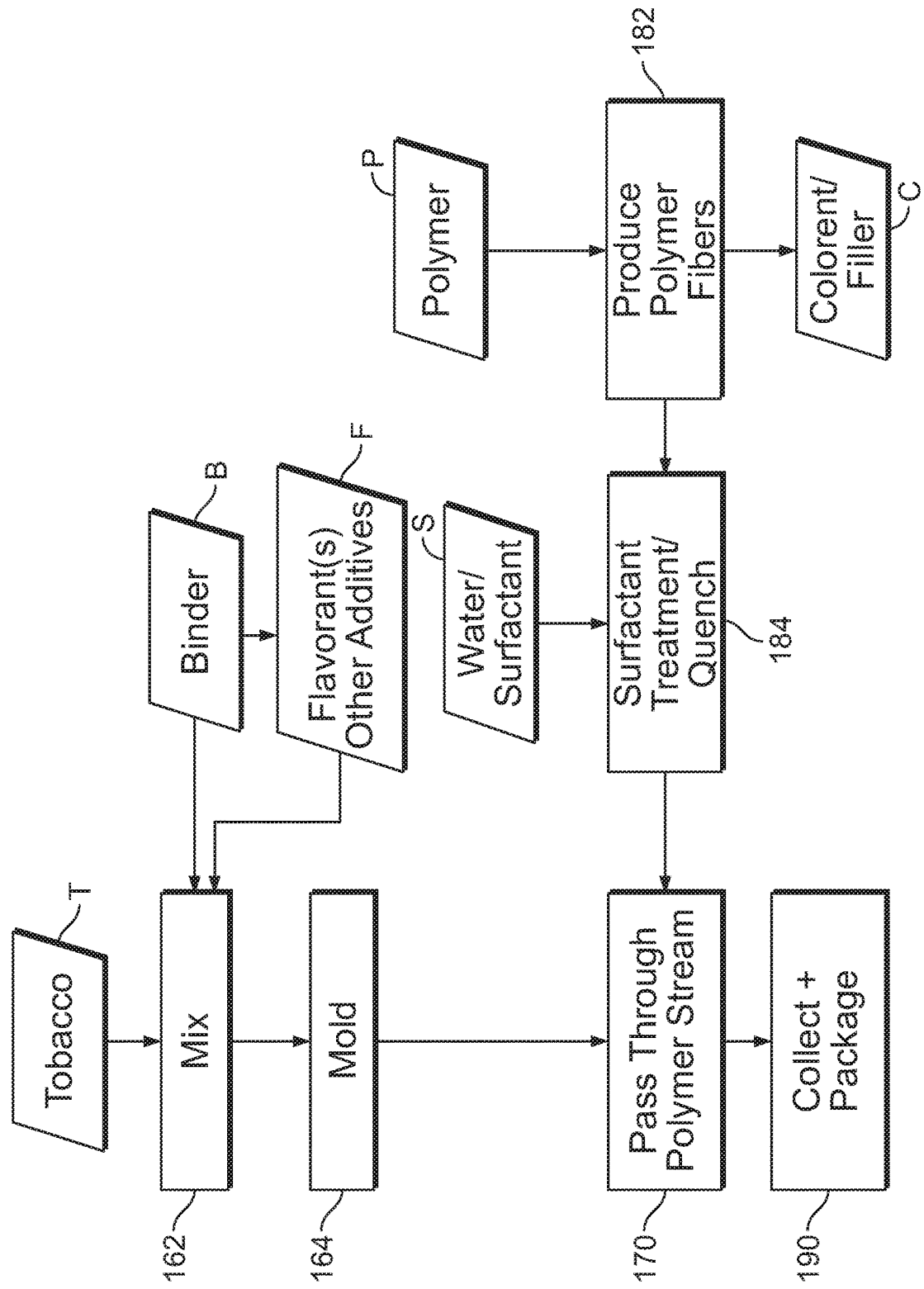
FIG. 1A is a flow chart showing an exemplary method of forming fiber-wrapped smokeless tobacco products.

This disclosure provides fiber-wrapped smokeless tobacco products and methods and materials for producing fiber-wrapped smokeless tobacco products. In some cases, polymeric fibers have a diameter of less than 100 microns and are deposited onto a body including smokeless tobacco. The polymeric fibers can wrap around the body and form a moisture-permeable porous surface. This disclosure is based, in part, on the discovery that the resulting fiber-wrapped smokeless tobacco products provide a unique tactile and flavor experience to an adult tobacco consumer. In particular, the polymeric fibers can provide a smooth mouth texture, bind/encase/encapsulate the smokeless tobacco during use, but give the adult tobacco consumer good access to the smokeless tobacco and any flavor contained therein. As compared to a typical pouch paper, the polymeric fibers can be softer, be free of seams, have a lower basis weight, act as less of a selective membrane, and greater moldability/manageability.

The methods of forming the fiber-wrapped smokeless tobacco products are also provided herein. In some cases, a body including smokeless tobacco material is passed through a stream of melt-blown polymeric fibers to form an outer layer of melt-blown polymeric fibers around the body. In some cases, a body including smokeless tobacco material is passed through a stream of force-spun polymeric fibers to form an outer layer of force-spun polymeric fibers around the body. The methods described herein result in products that remain cohesive and are less likely to break apart during packaging, handling, shipping, and during use by adult tobacco consumers. In some cases, the polymeric fibers provide a soft and highly porous coating around the smokeless tobacco. The methods described herein can enrobe and/or wrap smokeless tobaccos that are not suitable for being pouched using a typical pouching operation, for example smokeless tobaccos having an average partial aspect ratio of greater than 3 (e.g., long-cut smokeless tobacco) and/or high moisture tobacco (e.g., a tobacco having an OV content of greater than 47 weight percent).

The described combinations of the polymeric material and smokeless tobacco can provide a softer mouth feel. Moreover, in some cases, the polymeric material can be elastic or pliable (e.g., a polymeric polyurethane such as DESMOPAN DP 9370 A available from Bayer) thus forming a smokeless tobacco product that can tolerate being "worked" (e.g., chewed or squeezed) in the mouth without the tobacco dispersing within the mouth. For example, the smokeless tobacco product can be worked to provide flavor and/or to comfortably conform between the cheek and gum. In some cases, combinations of mouth-stable and mouth-dissolvable polymeric materials are combined with a body including smokeless tobacco material to provide a product that becomes looser after being placed in a mouth of an adult tobacco consumer, yet remains generally cohesive. Polymeric structural fibers can also be a composite of multiple materials, which may include both mouth-stable and mouth-dissolvable materials.

The fiber-wrapped smokeless tobacco products include polymeric structural fibers that form a nonwoven network against and around a body of smokeless tobacco material. As used herein, the term "nonwoven" means a material made from fibers that are connected by entanglement and/or bonded together by a chemical, heat or solvent treatment where the material does not exhibit the regular patterns of a woven or knitted fabric. Smokeless tobacco, for example, can be introduced into a stream of melt-blown and/or force spun polymeric material as a preformed body. In some cases, the stream of melt-blown and/or force spun polymeric material will coat the smokeless tobacco to form a soft and porous coating around the smokeless tobacco. In some cases, polymeric structural fibers can be produced and contacted with smokeless tobacco while the polymeric fibers are still above their melt temperature. In some cases, polymeric structural fibers can be cooled (e.g., quenched) prior to contacting or when fibers contact a body including smokeless tobacco material. In some cases, the polymeric structural fibers are treated with a surfactant and/or other additives to increase permittivity of the fiber wrapping.

The fiber-wrapped smokeless tobacco product can also be dimensionally stable. As used herein, "dimensionally stable" means that the fiber-wrapped smokeless tobacco product retains its shape under its own weight. In some cases, a fiber-wrapped smokeless tobacco product is flexible, yet can be picked up at one end without the force of gravity causing the fiber-wrapped smokeless tobacco product to bend or sag. In some cases, the fiber-wrapped smokeless tobacco product can be easily deformable.

Although other methods of producing the fiber-wrapped smokeless tobacco product are also contemplated, various methods of producing various fiber-wrapped smokeless tobacco products are discussed in more detail below.

Methods of Manufacture

One method of preparing the smokeless tobacco product includes directing polymeric fibers having a diameter of less than 100 microns (or less than 50 microns, or less than 30 microns, or less that 10 microns, or less than 5 microns, or less than 1 microns, or less that 0.5 microns, or less than 0.1 microns, or less than 0.05 microns) towards the smokeless tobacco such that the polymeric fibers enrobe and conform to the surface topography of the tobacco fibrous structures. These processes can be controlled such that the resulting composite tobacco product has a moisture-permeable porous surface and an overall oven volatiles content of between 4 and 61 weight percent. In some cases, the process is controlled to have an overall oven volatiles content of at least 30 weight percent.

FIG. 1A is a flow chart 160 showing an example of how the fiber-wrapped smokeless tobacco product can be made, collected, and packaged. In some cases, the smokeless tobacco T can be cured tobacco. Tobacco T can be added to a mixer. An optional binder B, and optionally flavorants F and/or other additives are mixed with the tobacco T in mixing step 162. For example, tobacco T can be long cut tobacco having an oven volatiles content of 10-61 weight percent. Optional binder B can be TICALOID LITE Powder. Optional flavorants F and other additives can include, for example, a mint flavoring, a sweetener, and a pH modifier. The mixing step 162 can occur in any commercially available countertop mixer or industrial mixer, for example a HOBART 40 lbs mixer or a FORBERG 250 lbs Paddle Mixer. Water can be added to the tobacco prior to or during the mixing process to alter the total oven volatiles content of the final fiber-wrapped smokeless tobacco product. The oven volatiles content can also be modified by heating the mixture. In some cases, a commercially available smokeless tobacco product (e.g., SKOAL Long Cut) can be mixed with a binder (e.g., TICALOID LITE Powder) to form the mixture, which can then be shaped into one or more bodies.

In some cases, the bodies provided herein can have less than 1% by weight of binder, less than 0.5% by weight of binder, less than 0.3% by weight of binder, less than 0.2% by weight of binder, less than 0.1% by weight of binder, or less than 0.05% by weight of binder. In some cases, the smokeless tobacco body includes one or more binders, such as a hydrocolloid, in an amount of between 0.05 weight percent and 0.8 weight percent. In some cases, the smokeless tobacco products include between 0.1 and 0.5 weight percent binder. For example, the preformed smokeless tobacco products can include between 0.2 and 0.4 weight percent of a binder that includes guar gum, xanthan gum, cellulose ether, or similar materials or a combination thereof.

The molding step 164 can include depositing the mixture into a mold. In some cases, the mixture is deposited into an open mold plate including a plurality of identically shaped cavities. The molding step 164 can include applying pressure to the mixture. The pressure can be applied as injection pressure applied to the mixture as it is forced into a closed cavity or by compressing each cavity filled with the mixture. The pressure used during the molding process impacts that amount of compression experienced by the mixture and thus the material properties of the mixture. In some cases, 50-300 lbs. of injection pressure is used to deliver the mixture into a plurality of mold cavities. The molds can be filled with continuous or intermittent pressure. A screw pump can be used to apply the pressure to the mixture. For example, a Formax® machine (e.g., the FORMAX F-6 and F-19 units) can be used to inject the mixture into cavities in a mold plate. For example, such a process is described in U.S. Patent Application Publication No. 2012/0024301, which is hereby incorporated by reference. In some cases, the mold cavities have shapes corresponding to the preformed product shapes shown in FIGS. 1B, 1C, and 4A-4N. In some cases, the mold cavities can have other shapes. In some cases, the mold cavities have a volume sized to create shaped smokeless tobacco bodies having a mass of, for example, about 2.35 grams. The edges and corners of the mold can be rounded to permit the shaped smokeless tobacco bodies to be easily released from the mold and be comfortable in the mouth of an adult tobacco consumer. In some cases, the molding step 164 can include extruding smokeless tobacco material (optionally with binders, flavorants, and other additives) and cutting the extruded smokeless tobacco material to form the preformed bodies.

The passing step 170 includes passing the bodies through a polymer deposition zone where a stream of polymeric fibers contact the preformed bodies and coats surfaces of the preformed bodies with polymeric fibers. In some cases, the passing step 170 includes dropping the bodies through a polymer deposition zone. In some cases, a holding device can be used to control the passage of the bodies through a polymer deposition zone. A variety of techniques can be used to ensure that the stream of polymeric fibers wrap around all sides of the bodies. These techniques can be used in a variety of combinations. In some cases, multiple streams of polymeric fibers can be directed towards a product path along different directions. For example, a single melt-blowing device can have a bent or curved array of spinnerets so that melt-blown polymeric fibers converge towards a drop path. In some cases, multiple polymer fiber producing devices are arranged so that multiple streams converge towards a product path. In some cases, multiple polymer producing devices are arranged in series along a drop path directed in different directions (e.g., opposite directions). In some cases, a single body can be passed through one or more streams multiple times. In some cases, spin can be applied to the bodies as they pass (e.g., drop) through the stream(s). For example, air jets can be used to spin bodies as they pass (e.g., drop) through the stream(s).

In some cases, the passing step 170 can include one or more holding devices (e.g., needle-like devices) that are pressed into the bodies and used to move the bodies through the polymer deposition zone. For example, two needle-like devices can be pushed into opposite sides of a body to secure the body. The needle-like devices can be made of metal and have a sharp point. In some cases, a single dowel can be pressed through the entire body to hold the body. In some cases, the needle(s) or dowel(s) can have a diameter that is sufficiently small so as to prevent the passage of significant amounts of tobacco through the uncovered portion of the body created by the needle(s) and/or dowel(s). In some cases, the needle(s) and/or dowel(s) can have a diameter of less than 500 microns, less than 100 microns, less than 50 microns, or less than 10 microns. The holding devices can be used to control the speed of movement of the body through the polymer deposition zone. The holding devices can be used to rotate the bodies as they pass through the polymer deposition zone, which can ensure that all sides of the body are exposed to the polymer stream and that fibers are wrapped around the body. The holding devices can be heated. A heated needle and/or dowel can minimize build-up of excess fibers on the needle or dowel while the body is being wrapped with the polymeric fibers. For example, an electric heater can be applied to a metal needle by heating a portion of the needle being held. In some cases, holding devices can be heated by induction. In some cases, multiple holding devices can be used to rotate the bodies through the polymer deposition zone along different axes. For example, two pairs of needles could be selectively engaged with a body to rotate a body about a first axis that is acute with the direction of the polymer flow followed by as second axis that is perpendicular to the first axis and acute with the direction of polymer flow. Other motion profiles are also possible. After a body is wrapped (e.g., enrobed), they can be ejected from the holding device(s). For example, a pair of needles can be moved apart to allow a body to drop. In some cases, a plate can slide over a surface of a holding device to eject the body.

In some cases, an electrostatic charge can be applied to the bodies and/or the polymer during step 170. When electrostatically charged, a preformed body can draw fibers directly onto the body, which can increase the efficiency of the wrapping process and minimize polymeric fibers that bypass the body. An electrostatic charge can also improve the coverage around the back side of the preformed body. In some cases, a holding device (e.g., one or more needle-like structures pushed into the body) can be used to apply an electrostatic charge to the body. In some cases, the polymer is electrostatically charged (e.g., as the polymer passes through the spinnerets).

The fibers produced in step 182 can be produced by melt-blowing and/or centrifugal force spinning, which are each described below. The polymer P can be any suitable polymers usable in a melt-blowing and/or centrifugal force spinning process, such as polypropylene, polyurethane, cellulose, polyethylene, PVC, viscose, polyester, and PLA. As shown in FIG. 1A, a polymer P (e.g., polypropylene) is added to a polymer producing device as part of step 182.

The melt-blown and/or centrifugal force spun polymeric fibers can be quenched (i.e., rapidly cooled to below their melt temperature) prior to or upon contacting the smokeless tobacco in step 184. For example, water or other liquid can be sprayed into a polymeric fiber stream prior to contact with a body including smokeless tobacco to quench the polymeric fibers. In some cases, the polymeric fibers can be quenched with a surfactant S, as shown in FIG. 1A. In some cases, the polymeric fibers can be cooled to below the melt temperature after contact with a body including smokeless tobacco.

The polymeric fibers produced in step 182 can have a diameter of less than 100 microns, less than 50 microns, less than 30 microns, less that 10 microns, less than 5 microns, less than 1 microns, less that 0.5 microns, less than 0.1 microns, less than 0.05 microns, or less than 0.01 microns. In some cases, melt-blown polymeric fibers can have a diameter of between 0.5 and 5 microns. In some case, force-spun polymeric fibers can have a diameter of between 10 nanometers and 1 micron. The flow of the polymeric fibers and the dimensions of the polymeric fibers as they exit a melt blowing or centrifugal force spinning apparatus result in an intimate contact between the fibers and the smokeless tobacco such that the polymeric fibers conform to the surface topography of the tobacco fibrous structures.

A collecting and packaging step 190 can include catching the fiber-wrapped smokeless tobacco products and packaging them in package (e.g., container). In some cases, the fiber-wrapped smokeless tobacco products are collected on a conveyor belt and transported to a position device that places a plurality of products in a container. For example, FIG. 1C depicts a container 300 including a plurality of fiber-wrapped smokeless tobacco products 100. After being placed in the interior space 301 of container 302, a lid 304 is mated with the connection rim 303 of the bottom container 302. A label can be applied to the closed container system 300 (e.g., applied to the outer cylindrical sidewalls of the bottom container 302 and the lid 304). Shrink wrap can also be applied to the closed container system 300. A plurality of filled, labeled, and shrink wrapped container systems 300 can then be placed in a box and shipped to a retail location.

Each fiber-wrapped smokeless tobacco product 100 can experience significant jarring movements during the landing after the drop, during sorting and placing the formed shaped smokeless tobacco bodies 100 into a container 300, closing, labeling, shrink wrapping, and bulk packaging the container 300, shipping containers to retail locations, stocking the containers at a retail location, and having an adult tobacco consumer purchase and carry around the container 300. The fiber-wrapped smokeless tobacco products 100 provided herein, however, can retain their structural integrity due to the fiber wrapping.

Melt-Blowing Processes

Figure 2A:
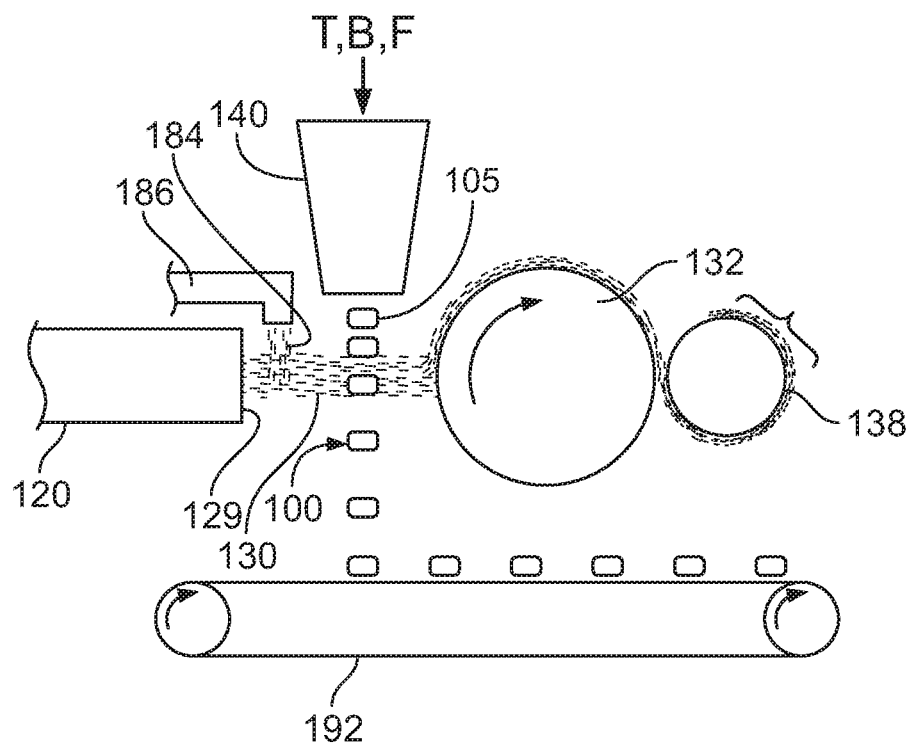
FIGS. 2A and 2B are schematic drawings of an exemplary method of forming fiber-wrapped smokeless tobacco products.
Figure 2B:
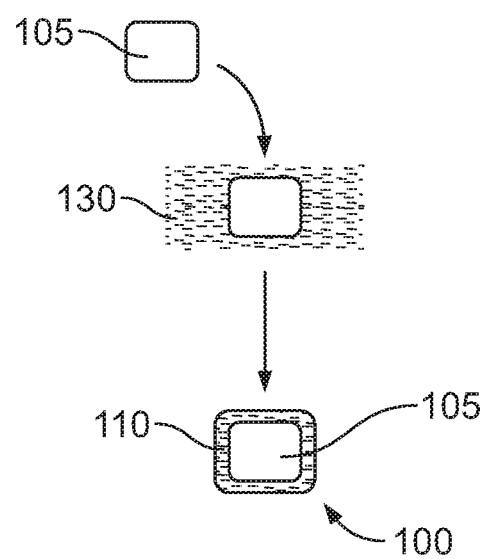
Figure 2C:
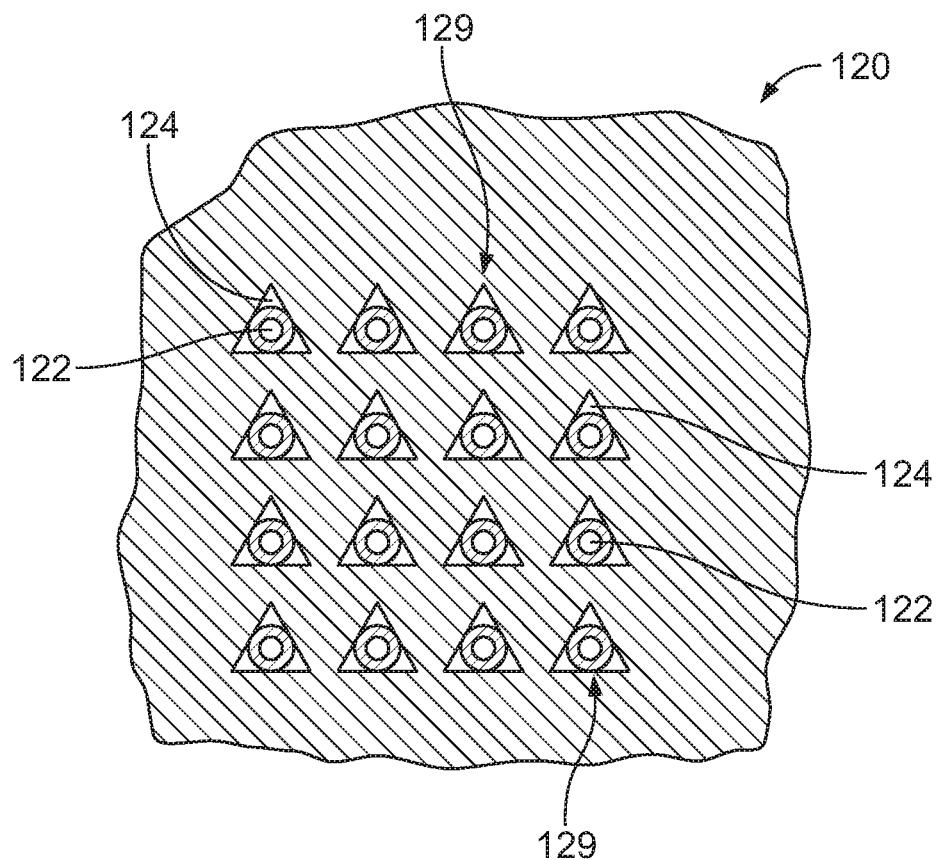
FIG. 2C depicts an exemplary arrangement of polymer orifices and air orifices for a melt-blowing apparatus.

Referring to FIGS. 2A and 2B, melt-blown polymeric fibers 130 can be produced using a melt-blowing device 120 and form a coating 110 of fibers around a body 105. Melt-blowing is an extrusion process where molten polymeric resins are extruded through an extrusion die (i.e., a spinneret) and gas is introduced to draw the filaments to produce polymeric fibers. The gas can be heated air blown at high velocity through orifices that surround each spinneret. In some cases, layers of hot air are blown through slots between rows of spinnerets—the strands of polymeric material are attenuated by being trapped between two layers of air. Other methods of delivering the attenuating gas (e.g., heated air) are possible. FIG. 2C depicts an exemplary arrangement of polymer orifices and air orifices for a melt-blowing devices 120. Other melt-blowing devices are described in U.S. Pat. Nos. 4,380,570; 5,476,616; 5,645,790; and 6,013,223 and in U.S. Patent Applications US 2004/0209540; US 2005/0056956; US 2009/0256277; US 2009/0258099; and US 2009/0258562, which are hereby incorporated by reference.

A melt-blowing device 120 can include a polymer extruder that pushes molten polymer at low or high melt viscosities through a plurality of polymer orifices 122. The melt-blowing device 120 includes one or more heating devices that heat the polymer as it travels through the melt-blowing device 120 to ensure that the polymer remains above its melting point and at a desired melt-blowing temperature. As the molten polymer material exits the polymer orifice 122, the polymer material is accelerated to near sonic velocity by gas being blown in parallel flow through one or more air orifices 124. The air orifices 124 can be adjacent to the polymer orifices 122. The air orifices 124 may surround each polymer orifice 122. In some cases, the air orifices 124 can be rounded. Each combination of a polymer orifice 122 with surrounding air orifices 124 is called a spinneret 129. For example, the melt-blowing device 120 can have between 10 and 500 spinnerets 129 per square inch. The polymer orifices 122 and the gas velocity through gas orifices 124 can be combined to form fibers of 100 microns or less. In some cases, the spinnerets each have a polymer orifice diameter of 30 microns or less. In some cases, the fibers have diameters of between 0.5 microns and 5 microns. The factors that affect fiber diameter include throughput, melt temperature, air temperature, air pressure, spinneret design, material, distance from the drum, spinneret design, and material being processed. In some cases, the spinnerets 129 each have a polymer orifice diameter of less than 900 microns. In some cases, the spinnerets 129 each have a polymer orifice diameter of at least 75 microns. The average polymer orifice diameter can range from 75 microns to 1800 microns. In some cases, the average polymer orifice diameter can be between 150 microns and 400 microns. In some cases, polymer orifice diameters of about 180 microns, about 230 microns, about 280 microns, or about 380 microns are used.

Smokeless tobacco can also be enrobed or wrapped with melt-blown polymeric fibers by dropping bodies 105 including smokeless tobacco T through a stream 130 of melt-blown polymeric fibers exiting an array of melt-blowing spinnerets. Bodies 105 including smokeless tobacco T, binder B, flavorants F, and other possible additives can be formed in a mixing/molding device 140. As each body 105 passes through the stream 130 of melt-blown polymeric fibers, the fibers wrap around each body to form a fiber wrapping 110. The melt-blown fibers can be at a temperature above or below the polymer melt temperature as the fibers impact the bodies 105. In some cases, a spray of quenching fluid 184 (e.g., air) is positioned to quench the polymeric fibers as they exit the die and prior to contacting the bodies 105. In some cases, air streams can be used to rotate the smokeless tobacco body 105 as it falls through the stream 130 to enhance to coverage of the body 105 with polymeric fibers. In some cases, one or more holding devices (e.g., needle-like devices) can pressed into the body 105 to hold the body in one or more desired orientations as the body is passed through the stream 130. In some cases, if the process fails to fully encapsulate the smokeless tobacco bodies 105, the backside of the bodies can also be sealed in a down-stream process. In some cases, a body 105 is cycled through the process multiple times to ensure that it is fully wrapped. Excess melt-blown fibers can be rolled onto a vacuum roll 132 and then onto a wind up roll 138, and possibly used in other products/processes.

Centrifugal Force Spinning Processes

Figure 3A:
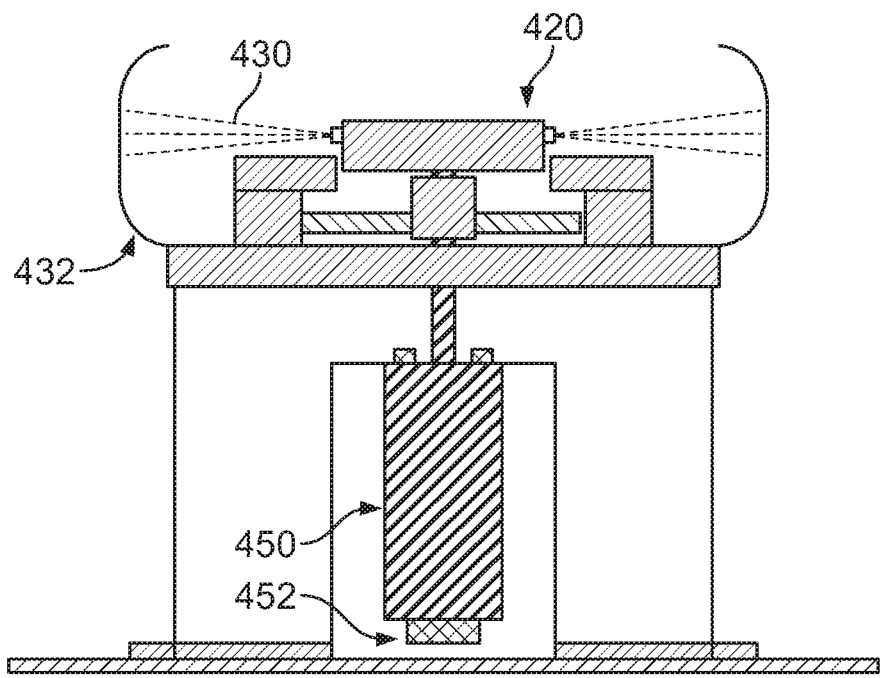
FIGS. 3A-3E illustrate a force-spinning apparatus.
Figure 3B:
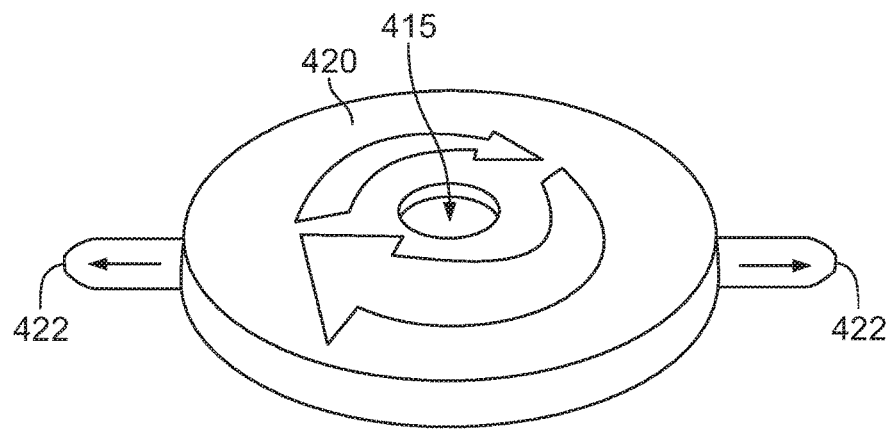
Figure 3C:
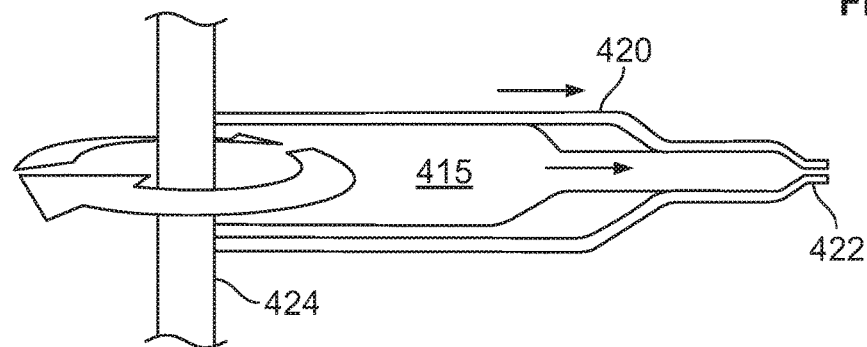
Figure 3D:
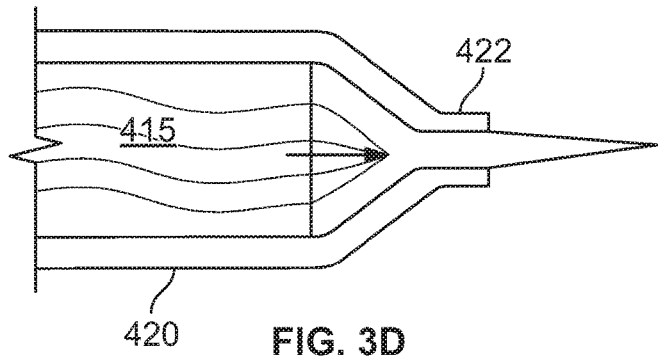
Figure 3E:
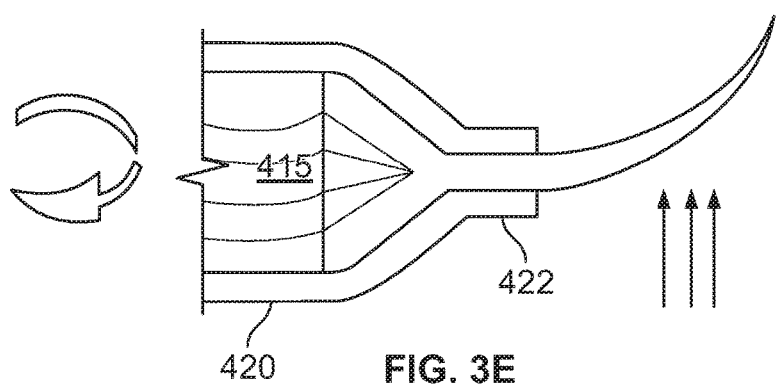

Centrifugal force spinning is a process where centrifugal force is used to create and orient polymeric fibers. FIGS. 3A-3E depict an exemplary centrifugal force spinning apparatus. As shown, a spinneret 420 holds polymeric material 415 and is rotated at high speeds with a motor 450 to produce polymeric fibers 430 that are deposited onto a fiber collector 432. FIG. 3B depicts a close-up of the spinneret 420 showing two orifices 422. Any number of orifices 422 can be used. The fiber collector 432 can be a continuous drum or a series of spaced collection fingers. As the spinneret 420 rotates, the polymeric material (in a liquid state) is pushed to the orifices 422 lining the outer wall of the spinneret 420. As the polymeric material enters the orifice chamber, molecules disentangle and then align directionally. Centrifugal and hydrostatic forces combine to initiate a liquid material jet. The external aerodynamic environment combined with the inertial force of continued rotation further applies shear forces and promote cooling and/or solvent evaporation to further stretch the fiber. The inertia force can stretch molecular chains into the nanoscale and the air turbulence can apply a shear force. A body including smokeless tobacco can be passed through the streams of centrifugal force spun polymer either by dropping the body through the stream 430 or by using holding devices (e.g., needle-like holding device) to move and/or rotate a body 105 within a polymer deposition zone (e.g., in a collection drum 432).

Polymeric Fibers

In some cases, the fibers are mouth-stable fibers. The mouth-stable fibers can have low extractables, have FDA food contact approval, and/or be manufactured by suppliers who are GMP approved. Highly desirable are materials that are easy to process and relatively easy to approve for oral use (e.g. quality, low extractables, has FDA food contact approval, suppliers are GMP approved). In some cases, the mouth-stable structural fibers are elastomers. Elastomers can provide webs with improved elongation and toughness. Suitable elastomers include VISTAMAX (ExxonMobil) and MD-6717 (Kraton). In some cases, elastomers can be combined with polyolefins at ratios ranging from 1:9 to 9:1. For example, elastomers (such as VISTAMAX or MD-6717) can be combined with polypropylene.

Mouth-dissolvable fibers could be made from hydroxypropyl cellulose (HPC), methyl hydroxypropyl cellulose (HPMC), polyvinyl alcohol (PVOH), PVP, polyethylene oxide (PEO), starch and others. These fibers could contain flavors, sweeteners, milled tobacco and other functional ingredients. The fibers 130 can, in some cases, be formed by extrusion or by solvent processes. In some cases, mouth dissolvable fibers can be combined with mouth-stable fibers to wrap the bodies 105 as provided herein. For example, alternating layers of mouth dissolvable fibers and mouth-stable fibers can be deposited on a body 105.

Colorants C and/or fillers can also be added to the polymer P in the melt-blowing device 120. The hydraulic permittivity of the fabric can also be increased by compounding the polymer P with a filler prior to melt-blowing the polymeric material. The hydraulic permittivity is the rate of fluid transfer through a substrate. In some cases, a colorant C can be used as the filler. For example, a brown colorant C can be added to a feed hopper of the extruder along with a polymer material P (e.g., polypropylene) prior to melt blowing the polymer into the fibers. In addition to improving the hydraulic permittivity, the colorant can improve the aesthetic appeal of the fiber-wrapped smokeless tobacco product 100. For example, a brown colorant can make a wrapped moist smokeless tobacco product appear moist. Table 1 below compares a melt-blown polypropylene polymer fabrics produced with and without brown colorant.

TABLE 1

| Replicates | | Analysis Results | |
|---|---|---|---|
| | | 3962 PP Polymer w/o Color | 3692 PP Polymer w/ Brown Color |
| | | Sample # | |
| | | 1 5-2-MB-001 PP3962, 3 g/m2 | 2 5-2-MB-006 PP3962, Techmer 8% 3.1 g/m2 |
| 6 | Tensile Integrity (mJ) | 5.73 | 7.19 |
| | Stdev | 0.89 | 1.23 |
| 15 | Permittivity (relative liquid flow through rate, s) | 8 | 3 |
| | Stdev | 0.5 | 0.4 |
| | Basis Weight (g/m2) | 3.0 | 3.1 |

As shown, the polypropylene having the brown colorant had an increased tensile integrity and a permittivity. Sample 2 includes eight weight percent of a brown color called Techmer. The colorant and the polymer can be compounded and pelletized prior to melt-blowing the polymer to ensure a consistent ratio of colorant C to polymer P. In some cases, the colorant C can be a liquid and can be injected into the polymeric material.

In some cases, the filler can include milled tobacco material. For example, milled tobacco could be combined into a polymeric structural fiber such that the polymeric material at least partially encapsulates the milled tobacco. For example, milled tobacco could be added to a molten polymer (e.g., polypropylene) in amounts of up to about 80% and extruded in a melt-blowing or centrifugal force spinning process. The milled tobacco can provide a unique texture or consumer experience while the polymeric material remains mouth-stable and cohesive.

As discussed above, the polymeric fibers can contact the bodies 105 at a temperature greater than the melt temperature of the polymer. In some cases, however, the polymeric fibers can be quenched and/or treated with a surfactant prior to contacting the bodies 105. Water vapor can be used to cool the polymeric material. For example, water vapor 184 from a spout 186 can be directed into the stream 130 of molten strands of polymeric material to "quench" the polymeric strands and form the fibers. For example, a mist 184 can be aimed towards the spinnerets 129 of the melt-blowing device 120. A fine mist of water vapor or surfactant or air can quickly cool the strands below the polymer melt temperature. In some cases, quenched melt-blown fibers can have improved softness and fiber/web tensile strength.

A surfactant treatment can also be applied to the fibers 130. In some cases, a surfactant S is applied to the polymeric fibers as they exit the spinnerets 129 of the melt-blowing device 120 or the orifices 422 of the centrifugal force spinning spinneret 420. In some cases, surfactant can be applied as a mist 184 (either with or without water). In some cases, the surfactant applied as a mist 184 can quench the polymeric fibers. In some cases, the surfactant can be applied in an extrusion process. In some cases, a mixture of water and surfactant can be atomized an applied as mist 184. Sweeteners and/or flavorants can also be atomized and applied to the polymeric fibers in mist 184.

Quenching the polymer can modify the crystallinity of the polymer material to improve tensile strength. The surfactant can improve the hydraulic permittivity of the fiber wrap 110 to improve moisture and flavor release from the product 100. The hydraulic permittivity is the rate of fluid transfer through a substrate. Table 2 compares fabrics produced with and without surfactant treatment and water quenching. As shown in Table 2, Sample 1 (produced without water quenching or a surfactant treatment) had a tensile integrity of 5.73 mJ and a permittivity of 8 seconds. Quenching with water (Sample 3) improved the tensile integrity to 7.09 mJ. Applying surfactant mixtures at different percentages also resulted in improved tensile integrity values (Samples 5-7). Added surfactant in amounts of 0.4% or greater (Samples 2, 6, and 7) increase the permittivity to 6 seconds.

composition may, in part, determine the flavor profile and mouth feel of the smokeless tobacco products 100.

Polymeric Materials

Suitable polymeric materials for the fibers wrapping the smokeless tobacco include one or more of the following polymer materials: acetals, acrylics such as polymethylmethacrylate and polyacrylonitrile, alkyds, polymer alloys, allyls such as diallyl phthalate and diallyl isophthalate, amines such as urea, formaldehyde, and melamine formaldehyde, epoxy, cellulosics such as cellulose acetate, cellulose triacetate, cellulose nitrate, ethyl cellulose, cellulose acetate, propionate, cellulose acetate butyrate, hydroxypropyl cellulose, hydroxypropyl methyl cellulose, carboxymethyl cellulose, cellophane and rayon, chlorinated polyether, coumarone-indene, epoxy, polybutenes, fluorocarbons such as PTFE, FEP, PFA, PCTFE, ECTFE, ETFE, PVDF, and PVF, furan, hydrocarbon resins, nitrile resins, polyaryl ether, polyaryl sulfone, phenol-aralkyl, phenolic, polyamide (nylon), poly (amide-imide), polyaryl ether, polycarbonate, polyesters such as aromatic polyesters, thermoplastic poly-

TABLE 2

Analytical Results Comparing Non-Treated & Surfactant Treated Melt Blown Material

| | Analysis Results | | | | | | |
|---|---|---|---|---|---|---|---|
| | 3962 PP Polymer | 3962 PP Polymer | 3962 PP Polymer | 3962 PP Polymer | 3962 PP Polymer | 3962 PP Polymer | 3962 PP Polymer |
| | | | | Sample # | | | |
| | 1<br>5-2-MB-001<br>PP3962<br>Standard<br>MB<br>Material | 2<br>5-2-MB-001<br>PP3963 LAB<br>ADDED<br>SURFACTANT | 3<br>5-2-MB-002<br>PP3962,<br>Water<br>Quenching,<br>3 g/m3 | 4<br>5-2-MB-002<br>PP3962, Water<br>Quenching, 3<br>g/m4 LAB<br>ADDED<br>SURFACTANT | 5<br>5-2-MB-003<br>PP3962,<br>Surfactant<br>0.2%, 3 g/m2 | 6<br>5-2-MB-004<br>PP3962,<br>Surfactant<br>0.4%, 3 g/m2 | 7<br>5-2-MB-005<br>PP3962,<br>Surfactant<br>0.6%, 3 g/m2. |
| Tensile Integrity (mJ) | 5.73 | | 7.09 | | 6.94 | 6.10 | 6.12 |
| Stdev | 0.89 | | 0.75 | | 0.85 | 1.19 | 0.67 |
| Permittivity (relative liquid flow through rate, s) | 8 | 6 | 7 | 6 | 8 | 6 | 6 |
| Stdev | 0.5 | 0.3 | 0.4 | 0.5 | 0.0 | 0.0 | 0.0 |
| Basis Weight (g/m2) | 3.0 | 3 | 3.0 | 3.0 | 3.0 | 3.0 | 3.0 |

The tensile integrity of the wrapped fiber can also be improved by bonding fibers together. In some cases, the wrapped fiber can be heat bonded at intersection points. The heating of the polymeric material to a temperature above its melt temperature can be accomplished by using electrically heated surfaces, ultrasonic bonding, infrared energy, radio frequency energy, and microwave energy. Stitch bonding, point bonding, and quilting are methods of applying patterns to nonwoven fabrics. These are forms of thermal bonding typically achieved with ultrasonic bonding processes although other energy sources and related equipment can be used to create particular patterns of bonding within the network of fibers.

Product Components

The smokeless tobacco products 100 include smokeless tobacco 105 and polymeric material 110. The smokeless tobacco product 100 can optionally include one or more flavorants and other additives. In some cases, smokeless tobacco 105 includes smokeless tobacco. In some cases, the smokeless tobacco can be moist, cured, fermented smokeless tobacco. In some cases, the smokeless tobacco can be non-fermented tobacco. In some cases, the smokeless tobacco can be vacuum treated tobacco. The particular ester, PBT, PTMT, (polyethylene terephthalate) PET and unsaturated polyesters such as SMC and BMC, thermoplastic polyimide, polymethyl pentene, polyolefins such as LDPE, LLDPE, HDPE, and UHMWPE, polypropylene, ionomers such as PD and poly allomers, polyphenylene oxide, polyphenylene sulfide, polyurethanes (such as DESMOPAN DP 9370A available from Bayer), poly p-xylylene, silicones such as silicone fluids and elastomers, rigid silicones, styrenes such as PS, ADS, SAN, styrene butadiene latricies, and styrene based polymers, suflones such as polysulfone, polyether sulfone and polyphenyl sulfones, polymeric elastomers, and vinyls such as PVC, polyvinyl acetate, polyvinylidene chloride, polyvinyl alcohol, polyvinyl butyrate, polyvinyl formal, propylene-vinyl chloride copolymer, ethylvinyl acetate, and polyvinyl carbazole, polyvinyl pyrrolidone, and polyethylene oxide, ethylene vinyl alcohol, sugar alcohols, and starches.

The polymeric material can include multiple materials. In some cases, structural fibers of a first polymeric material are interspersed or layered with structural fibers of a second polymeric material. For example, a lower melting polymer can function as a binder which may be a separate fiber interspersed with higher melting structural polymeric fibers.

In some cases, structural fibers can include multiple components made of different materials. For example, a lower melting sheath can surround a higher melting core, which can help with the conforming and/or bonding processes. The components of a multi-component fiber can also be extruded in a side-by-side configuration. For example, different polymeric materials can be co-extruded and drawn in a melt-blowing or spun bond process to form the multi-component structural fibers.

In some cases, the polymeric material includes one mouth-stable material and one mouth-dissolvable material such that the smokeless tobacco product will loosen but remain cohesive as the mouth-dissolvable material dissolves away. In some cases, a network of structural polymeric fibers includes mouth-dissolvable polymeric fibers and mouth-stable polymeric fibers. As used herein, "mouth-stable" means that the material remains cohesive when placed in a mouth of an adult tobacco consumer for 1 hour. As used herein, "mouth-dissolvable" means that the material breaks down within 1 hour after being exposed to saliva and other mouth fluids when placed in a mouth of an adult tobacco consumer. Mouth-dissolvable materials include hydroxypropyl cellulose (HPC), hydroxypropyl methyl cellulose (HPMC), polyvinyl alcohol (PVOH), PVP, polyethylene oxide (PEO), carboxyl methyl cellulose (CMC), starch, gums, maltodextrin, sugar alcohols (e.g., sorbitol), and others. Mouth-dissolvable materials could be combined with flavors, sweeteners, milled tobacco and other functional ingredients. In some cases, multi-component fibers include a mouth-stable material and a mouth-dissolvable material.

In some cases, the polymeric material includes reconstituted cellulosic fibers. Reconstituted cellulosic fibers can be created from various woods and annual plants by physically dissolving the wood or plant material in a suitable solvent, such as methylmorpholine oxide (MNNO) monohydrate. The concentration of cellulose in the solution can be between 6 weight and 15 weight percent. The solution can then be spun (e.g., melt-blown or spun bond) at a temperature of between 70° C. and 120° C. to create reconstituted cellulosic fibers. In some cases, the reconstituted cellulosic fibers are made using tobacco material (e.g., tobacco stems, leaves). Reconstituted tobacco cellulosic fibers can then be intermingled with smokeless tobacco having natural cellulosic fibers to create a fiber-wrapped smokeless tobacco product having tobacco-derived structural fibers. The reconstituting process changes the composition of the tobacco and removes soluble tobacco components.

The polymeric material can also be combined with milled tobacco prior to contacting the tobacco with the smokeless tobacco. In some cases, the milled tobacco can have an average particle size of between 0.01 microns and 200 microns. For example, milled tobacco could be combined into a polymeric structural fiber such that the polymeric material at least partially encapsulates the milled tobacco. For example, milled tobacco could be added to a molten polymer (e.g., polypropylene) in amounts of up to about 80% and extruded in a melt-blowing or spun bond process. The milled tobacco can provide a unique texture while the polymeric material remains mouth-stable and cohesive.

The amount of polymeric material used in the smokeless tobacco product 100 depends on the desired flavor profile and desired mouth feel. In some cases, the smokeless tobacco product 100 includes less than 200 mg of polymer for a single product 100. In some cases, a product 100 can include between 5 and 100 mg of polymeric material, between 60 and 80 mg of polymeric material, between 10 and 50 mg of polymeric material, or between 25 and 75 mg of polymeric material. In some cases, a product 100 includes between 0.1% and 10% by weight of polymeric material, between 0.4% and 5% by weight of polymeric material, between 0.5% and 2% by weight of polymeric material, between 2% and 4% by weight of polymeric material, or between 1% and 3% by weight of polymeric material. In some cases, the basis weight of the wrapping of polymeric fibers 110 can have a basis weight of less than 30 gsm, less than 25 gsm, less than 20 gsm, less than 15 gsm, less than 10 gsm, less than 5 gsm, less than 4 gsm, less than 3 gsm, less than 2 gsm, or less than 1 gsm. In some cases, the wrapping of polymeric fibers 110 can have a basis weight of between 0.5 gsm and 4 gsm, between 1 gsm and 3 gsm, or of about 2 gsm.

Tobacco

Smokeless tobacco is tobacco suitable for use in an orally used tobacco product. By "smokeless tobacco" it is meant a part, e.g., leaves, and stems, of a member of the genus *Nicotiana* that has been processed. Exemplary species of tobacco include *N. rustica, N. tabacum, N. tomentosiformis*, and *N. sylvestris*. Suitable tobaccos include fermented and unfermented tobaccos. In addition to fermentation, the tobacco can also be processed using other techniques. For example, tobacco can be processed by heat treatment (e.g., cooking, steam treating, toasting), flavoring, enzyme treatment, expansion and/or curing. Both fermented and non-fermented tobaccos can be processed using these techniques. In some cases, the tobacco can be unprocessed tobacco. Specific examples of suitable processed tobaccos include, dark air-cured, dark fire cured, burley, flue cured, and cigar filler or wrapper, as well as the products from the whole leaf stemming operation. In some cases, smokeless tobacco includes up to 70% dark tobacco on a fresh weight basis.

Tobacco can be conditioned by heating, sweating and/or pasteurizing steps as described in U.S. Publication Nos. 2004/0118422 or 2005/0178398. Fermenting typically is characterized by high initial moisture content, heat generation, and a 10 to 20% loss of dry weight. See, e.g., U.S. Pat. Nos. 4,528,993; 4,660,577; 4,848,373; and 5,372,149. In addition to modifying the aroma of the leaf, fermentation can change the color, texture, taste, and sensorial attributes of a leaf. Also during the fermentation process, evolution gases can be produced, oxygen can be taken up, the pH can change, and the amount of water retained can change. See, for example, U.S. Publication No. 2005/0178398 and Tso (1999, Chapter 1 in Tobacco, Production, Chemistry and Technology, Davis & Nielsen, eds., Blackwell Publishing, Oxford). Cured, or cured and fermented tobacco can be further processed (e.g., cut, expanded, blended, milled or comminuted) prior to incorporation into the smokeless tobacco product. The tobacco, in some cases, is long cut fermented cured moist tobacco having an oven volatiles content of between 10 and 61 weight percent prior to mixing with the polymeric material and optionally flavorants and other additives.

The tobacco can, in some cases, be prepared from plants having less than 20 µg of DVT per $cm^2$ of green leaf tissue. For example, the tobacco particles can be selected from the tobaccos described in U.S. Patent Publication No. 2008/0209586, which is hereby incorporated by reference. Tobacco compositions containing tobacco from such low-DVT varieties exhibits improved flavor characteristics in sensory panel evaluations when compared to tobacco or tobacco compositions that do not have reduced levels of DVTs.

Green leaf tobacco can be cured using conventional means, e.g., flue-cured, barn-cured, fire-cured, air-cured or sun-cured. See, for example, Tso (1999, Chapter 1 in Tobacco, Production, Chemistry and Technology, Davis & Nielsen, eds., Blackwell Publishing, Oxford) for a description of different types of curing methods. Cured tobacco is usually aged in a wooden drum (i.e., a hogshead) or cardboard cartons in compressed conditions for several years (e.g., two to five years), at a moisture content ranging from 10% to about 25%. See, U.S. Pat. Nos. 4,516,590 and 5,372,149. Cured and aged tobacco then can be further processed. Further processing includes conditioning the tobacco under vacuum with or without the introduction of steam at various temperatures, pasteurization, and fermentation. Fermentation typically is characterized by high initial moisture content, heat generation, and a 10 to 20% loss of dry weight. See, e.g., U.S. Pat. Nos. 4,528,993, 4,660,577, 4,848,373, 5,372,149; U.S. Publication No. 2005/0178398; and Tso (1999, Chapter 1 in Tobacco, Production, Chemistry and Technology, Davis & Nielsen, eds., Blackwell Publishing, Oxford). Cure, aged, and fermented smokeless tobacco can be further processed (e.g., cut, shredded, expanded, or blended). See, for example, U.S. Pat. Nos. 4,528,993; 4,660, 577; and 4,987,907.

The smokeless tobacco can be processed to a desired size. For example, long cut smokeless tobacco typically is cut or shredded into widths of about 10 cuts/inch up to about 110 cuts/inch and lengths of about 0.1 inches up to about 1 inch. Double cut smokeless tobacco can have a range of particle sizes such that about 70% of the double cut smokeless tobacco falls between the mesh sizes of −20 mesh and 80 mesh. Other lengths and size distributions are also contemplated.

The smokeless tobacco can have a total oven volatiles content of about 10% by weight or greater; about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight. Those of skill in the art will appreciate that "moist" smokeless tobacco typically refers to tobacco that has an oven volatiles content of between about 40% by weight and about 60% by weight (e.g., about 45% by weight to about 55% by weight, or about 50% by weight). As used herein, "oven volatiles" are determined by calculating the percentage of weight loss for a sample after drying the sample in a pre-warmed forced draft oven at 110° C. for 3.25 hours. The fiber-wrapped smokeless tobacco product can have a different overall oven volatiles content than the oven volatiles content of the smokeless tobacco used to make the fiber-wrapped smokeless tobacco product. The processing steps described herein can reduce or increase the oven volatiles content. The overall oven volatiles content of the fiber-wrapped smokeless tobacco product is discussed below.

The fiber-wrapped smokeless tobacco product can include between 15 weight percent and 85 weight percent smokeless tobacco on a dry weight basis. The amount of smokeless tobacco in a fiber-wrapped smokeless tobacco product on a dry weight basis is calculated after drying the fiber-wrapped smokeless tobacco product in a pre-warmed forced draft oven at 110° C. for 3.25 hours. The remaining non-volatile material is then separated into tobacco material and polymeric material. The percent smokeless tobacco in the fiber-wrapped smokeless tobacco product is calculated as the weight smokeless tobacco divided by the total weight of the non-volatile materials. In some cases, the fiber-wrapped smokeless tobacco product includes between 20 and 60 weight percent tobacco on a dry weight basis. In some cases, the fiber-wrapped smokeless tobacco product includes at least 28 weight percent tobacco on a dry weight basis. For example, a fiber-wrapped smokeless tobacco product can include a total oven volatiles content of about 57 weight percent, about 3 weight percent polymeric material, and about 40 weight percent smokeless tobacco on a dry weight basis.

In some cases, a plant material other than tobacco is used as a tobacco substitute in the fiber-wrapped smokeless tobacco product. The tobacco substitute can be an herbal composition. Herbs and other edible plants can be categorized generally as culinary herbs (e.g., thyme, lavender, rosemary, coriander, dill, mint, peppermint) and medicinal herbs (e.g., Dahlias, Cinchona, Foxglove, Meadowsweet, Echinacea, Elderberry, Willow bark). In some cases, the tobacco is replaced with a mixture of non-tobacco plant material. Such non-tobacco compositions may have a number of different primary ingredients, including but not limited to, tea leaves, red clover, coconut flakes, mint leaves, ginseng, apple, corn silk, grape leaf, and basil leaf. The plant material typically has a total oven volatiles content of about 10% by weight or greater; e.g., about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight.

Binders

Binders can be used to bind together smokeless tobacco material to form a body, which can then be encased or wrapped with polymeric fibers. Binders suitable for use in the fiber-wrapped smokeless tobacco product provided herein include orally compatible polymers, such as cellulosics (e.g., carboxymethyl cellulose (CMC), hydroxypropyl cellulose (HPC), hydroxyethyl cellulose (HEC), hydroxypropyl methyl cellulose (HPMC), and methyl cellulose (MC)); natural polymers (e.g., starches and modified starches, konjac, collagen, inulin, soy protein, whey protein, casein, and wheat gluten); seaweed-derived polymers (e.g., carrageenan (kappa, iota, and lambda); alginates, (and propylene glycol alginate), microbial-derived polymers (e.g., xanthan, dextrin, pullulan, curdlan, and gellan); extracts (e.g., locust bean gum, guar gum, tara gum, gum tragacanth, pectin (lo methoxy and amidated), agar, zein, karaya, gelatin, psyllium seed, chitin, and chitosan), exudates (e.g., gum acacia (arabic) and shellac), synthetic polymers (e.g., polyvinyl pyrrolidone, polyethylene oxide, and polyvinyl alcohol)).

The binder, in some cases, is guar gum, xanthan, cellulose, or a combination thereof. The cellulose can be carboxymethyl cellulose (CMC). Guar gum, xanthan, CMC, and some combinations thereof can be obtained from, for example, TIC Gums Inc., located in White Marsh, Md. and at www.ticgums.com. Guar gum is sold by TIC Gums Inc. under the trade name GUARNT. Carboxymethyl cellulose (CMC) is sold by TIC Gums Inc. under the trade name TICALOSE. Xanthan is sold by TIC Gums Inc. under the trade name TICAXAN. TIC Gums Inc. also sells some mixed binders, such as the mixed binder systems sold under the trade names TICALOID and TICAFILM. In some cases, TICALOID LITE Powder is used as the binder in the preformed smokeless tobacco products.

The binder can be present in amounts that allow the fiber-wrapped smokeless tobacco product 100 to remain cohesive during a pass through the stream 130. In some cases, the fiber-wrapped smokeless tobacco product 100 includes at least 0.05 weight percent binder. The fiber-wrapped smokeless tobacco product 100 has, in some cases, less than 5.0 weight percent binder. The fiber-wrapped smokeless tobacco product 100 has, in some cases, less than 1.0 weight percent binder. In some cases, the binder of each fiber-wrapped smokeless tobacco product 100 is between 0.05 and 0.5 weight percent of the preformed smokeless tobacco product. The binder of each fiber-wrapped smokeless tobacco product 100 can also be in an amount of between 0.1 and 0.4 weight percent.

Flavorants and Additives

Figure 4A:
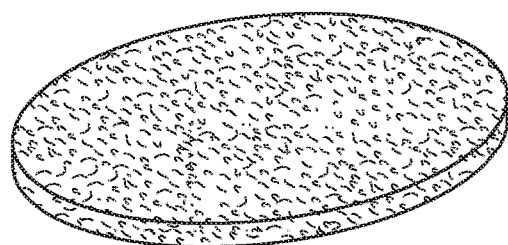
FIGS. 4A-4N depict alternative shapes for the fiber-wrapped smokeless tobacco product.
Figure 4B:
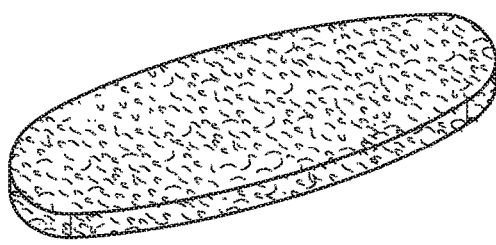
Figure 4C:
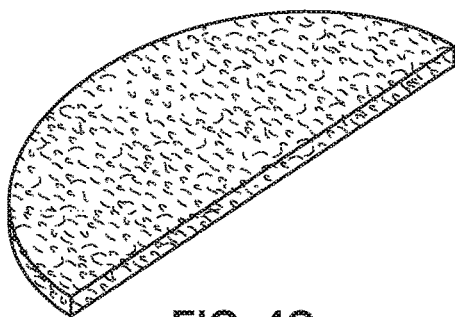
Figure 4D:
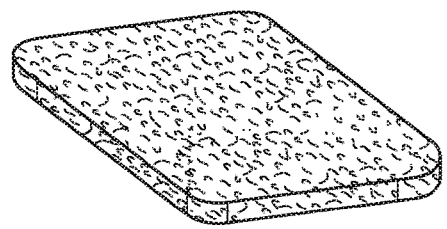
Figure 4E:
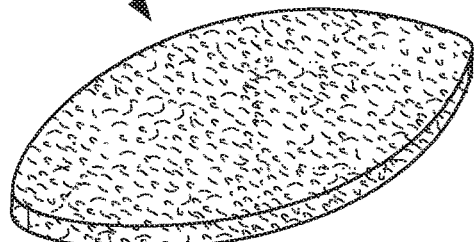
Figure 4F:
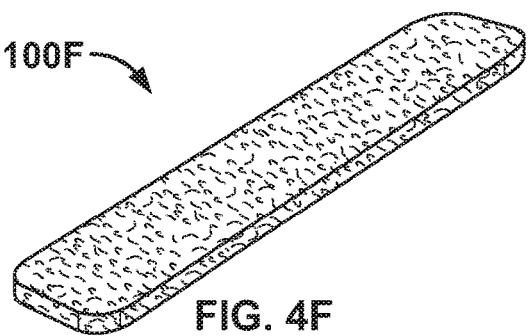
Figure 4G:
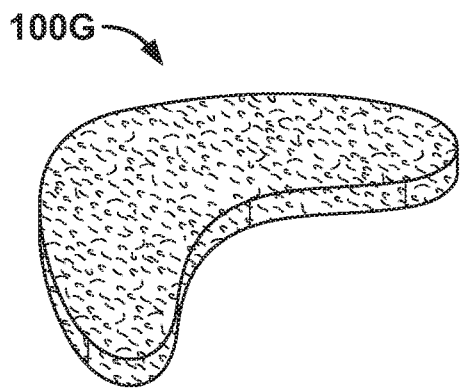
Figure 4H:
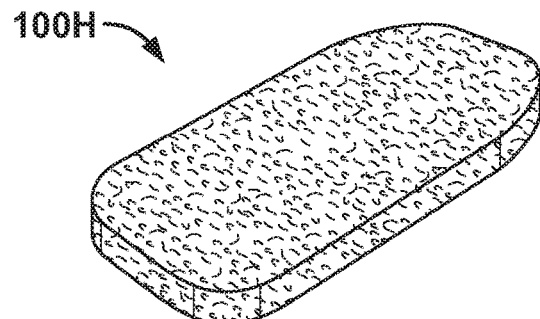
Figure 4I:
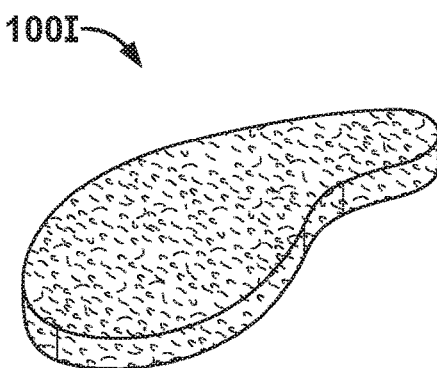
Figure 4J:
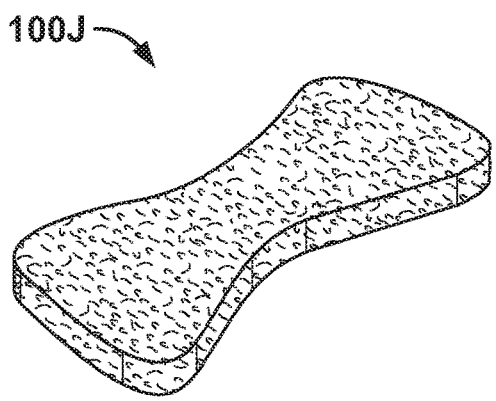
Figure 4K:
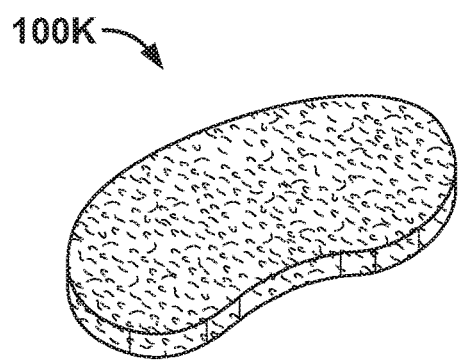
Figure 4L:
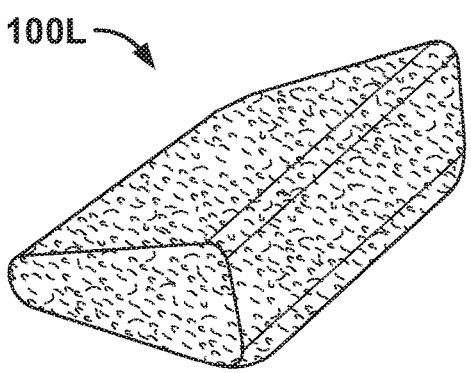
Figure 4M:
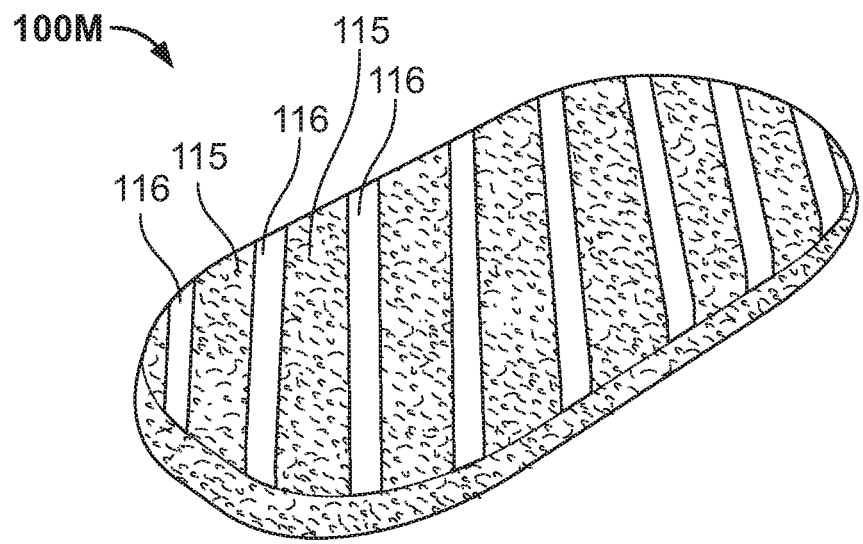

Flavors and other additives can be included in the compositions and arrangements described herein and can be added to the fiber-wrapped smokeless tobacco products 100 at any point in the process of making the fiber-wrapped smokeless tobacco products. For example, any of the initial components, including the polymeric material, can be provided in a flavored form. In some cases, flavorants and/or other additives are included in the smokeless tobacco. In some cases, flavorants and/or other additives are absorbed into to the smokeless tobacco product 100 after the polymeric material and the tobacco are combined. In some cases, flavorants and/or other additives are sprayed onto a stream 130 as part of a quenching and/or surfactant mist 184. Alternatively or additionally, flavor can be applied prior to being further processed (e.g., cut or punched into shapes) or flavor can be applied prior to packaging. Referring to FIG. 4M, for example, some embodiments of a smokeless tobacco product 100M can be equipped with flavors, in the form of flavor strips 116 or can be completely enrobed with dissolvable flavor film.

Suitable flavorants include wintergreen (i.e., methyl salicylate), cherry and berry type flavorants, various liqueurs and liquors such as Dramboui, bourbon, scotch, whiskey, spearmint, peppermint, lavender, cinnamon, cardamon, apium graveolents, clove, cascarilla, nutmeg, sandalwood, bergamot, geranium, honey essence, rose oil, vanilla, lemon oil, orange oil, Japanese mint, cassia, caraway, cognac, jasmin, chamomile, menthol, ilangilang, sage, fennel, piment, ginger, anise, coriander, coffee, liquorish, and mint oils from a species of the genus Mentha. Mint oils useful in some cases of the fiber-wrapped smokeless tobacco products 100 include spearmint and peppermint.

Flavorants can also be included in the form of flavor beads (e.g., flavor capsules, flavored starch beads, flavored gelatin beads), which can be dispersed within the fiber-wrapped smokeless tobacco product (e.g., in a nonwoven network of polymeric structural fibers). For example, the fiber-wrapped smokeless tobacco product could include the beads described in U.S. Patent Application Publication 2010/0170522, which is hereby incorporated by reference.

In some cases, the amount of flavorants in the fiber-wrapped smokeless tobacco product 100 is limited to less than 10 weight percent in sum. In some cases, the amount of flavorants in the fiber-wrapped smokeless tobacco product 100 is limited to be less than 5 weight percent in sum. For example, certain flavorants can be included in the fiber-wrapped smokeless tobacco product in amounts of about 3 weight percent.

Other optional additives include as fillers (e.g., starch, di-calcium phosphate, lactose, sorbitol, mannitol, and microcrystalline cellulose), soluble fiber (e.g., Fibersol from Matsushita), calcium carbonate, dicalcium phosphate, calcium sulfate, and clays), lubricants (e.g., lecithin, stearic acid, hydrogenated vegetable oil, canola oil, mineral oil, polyethylene glycol 4000-6000 (PEG), sodium lauryl sulfate (SLS), glyceryl palmitostearate, sodium benzoate, sodium stearyl fumarate, talc, and stearates (e.g., Mg or K), and waxes (e.g., glycerol monostearate, propylene glycol monostearate, and acetylated monoglycerides)), plasticizers (e.g., glycerine (SP?), propylene glycol, polyethylene glycol, sorbitol, mannitol, triacetin, and 1,3 butane diol), stabilizers (e.g., ascorbic acid and monosterol citrate, BHT, or BHA), artificial sweeteners (e.g., sucralose, saccharin, and aspartame), disintegrating agents (e.g., starch, sodium starch glycolate, cross caramellose, cross linked PVP), pH stabilizers, salt, or other compounds (e.g., vegetable oils, surfactants, and preservatives). Some compounds display functional attributes that fall into more than one of these categories. For example, propylene glycol can act as both a plasticizer and a lubricant and sorbitol can act as both a filler and a plasticizer. As noted above, fillers or colorants can be added to the polymer prior to melt-blowing the polymer in order to increase the permittivity of the wrapped fibers.

Oven volatiles, such as water, may also be added to the fiber-wrapped smokeless tobacco product 100 to bring the oven volatiles content of the fiber-wrapped smokeless tobacco product into a desired range. In some cases, flavorants and other additives are included in a hydrating liquid.

Oven Volatiles

The fiber-wrapped smokeless tobacco product 100 can have a total oven volatiles content of between 10 and 61 weight percent. In some cases, the total oven volatiles content is at least 40 weight percent. The oven volatiles include water and other volatile compounds, which can be a part of the tobacco, the polymeric material, the flavorants, and/or other additives. As used herein, the "oven volatiles" are determined by calculating the percentage of weight loss for a sample after drying the sample in a pre-warmed forced draft oven at 110° C. for 3.25 hours. Some of the processes may reduce the oven volatiles content (e.g., heating the composite or contacting the smokeless tobacco with a heated polymeric material), but the processes can be controlled to have an overall oven volatiles content in a desired range. For example, water and/or other volatiles can be added back to the fiber-wrapped smokeless tobacco product to bring the oven volatiles content into a desired range. In some cases, the oven volatiles content of the fiber-wrapped smokeless tobacco product 100 is between 4 and 61 weight percent. In some cases, the oven volatiles content of the fiber-wrapped smokeless tobacco product 100 is between 47 and 61 weight percent. For example, the oven volatiles content of smokeless tobacco 105 used in the various processed described herein can be about 57 weight percent. In some cases, the oven volatiles content can be between 10 and 30 weight percent.

Exemplary Packaging System and Method of Use

Referring to FIG. 1C, some embodiments of a smokeless tobacco system 300 can include one or more smokeless tobacco products 100 containing smokeless tobacco 105 stabilized by polymeric fibers 110. A plurality of smokeless tobacco products 100 can be arranged in an interior space of a bottom container 302 that mates with a lid 304. The plurality of the fiber-wrapped smokeless tobacco products 100 arranged in the container 300 can all have a substantially similar shape so that an adult tobacco consumer can conveniently select any of the similarly shaped smokeless tobacco products 100 therein and receive a generally consistent portion of the smokeless tobacco 105.

Still referring to FIG. 1C, the bottom container 302 and lid 304 can releasably mate at a connection rim 303 so as to maintain freshness and other product qualities of smokeless tobacco products 100 contained therein. Such qualities may relate to, without limitation, texture, flavor, color, aroma, mouth feel, taste, ease of use, and combinations thereof. In particular, the bottom container 302 may have a generally cylindrical shape and include a base and a cylindrical side wall that at least partially defines the interior space 301. In some cases, the container is moisture-tight. Certain containers can be air-tight. The connection rim 303 formed on the container 302 provides a snap-fit engagement with the lid 304. It will be understood from the description herein that, in addition to the container 300, many other packaging options are available to hold one or more of the smokeless tobacco products 100.

In some cases, each smokeless tobacco product 100 can be configured for oral use in a manner similar to that of a pouch containing tobacco therein. Briefly, in use, the system 300 can be configured so that an adult tobacco consumer can use a finger 314 and thumb 312 to readily grasp at least one of the fiber-wrapped smokeless tobacco products 100 for placement in a mouth of an adult tobacco consumer, thereby receiving a predetermined portion of smokeless tobacco with each smokeless tobacco products 100. In some cases, the predetermined portion of smokeless tobacco is generally consistent with each of the other smokeless tobacco products 100 stored in the container. For example, each fiber-wrapped smokeless tobacco product can provide between 0.25 and 4.0 grams of smokeless tobacco. Accordingly, the system 300 can permit an adult tobacco consumer to receive consistent portions of smokeless tobacco with each placement of the smokeless tobacco product 100 in his or her mouth. In some cases, the adult tobacco consumer can experience the tactile and flavor benefits of having smokeless tobacco exposed yet contained within a mouth of the adult tobacco consumer. The texture of a polymeric material exterior surface (e.g., an exterior surface including melt-blown polymeric fibers) may provide an adult tobacco consumer with a pleasing mouth feel and greater fluid transfer. In particular, a lack of any seams (typically associated with a pouched smokeless tobacco product) can provide a more pleasing mouth feel. In some cases, the smokeless tobacco is a type of smokeless tobacco that is not suitable for industrial pouching machines, such as smokeless tobacco having an average aspect ratio of greater than 3 (e.g., long-cut smokeless tobacco).

Product Configurations

Figure 1B:
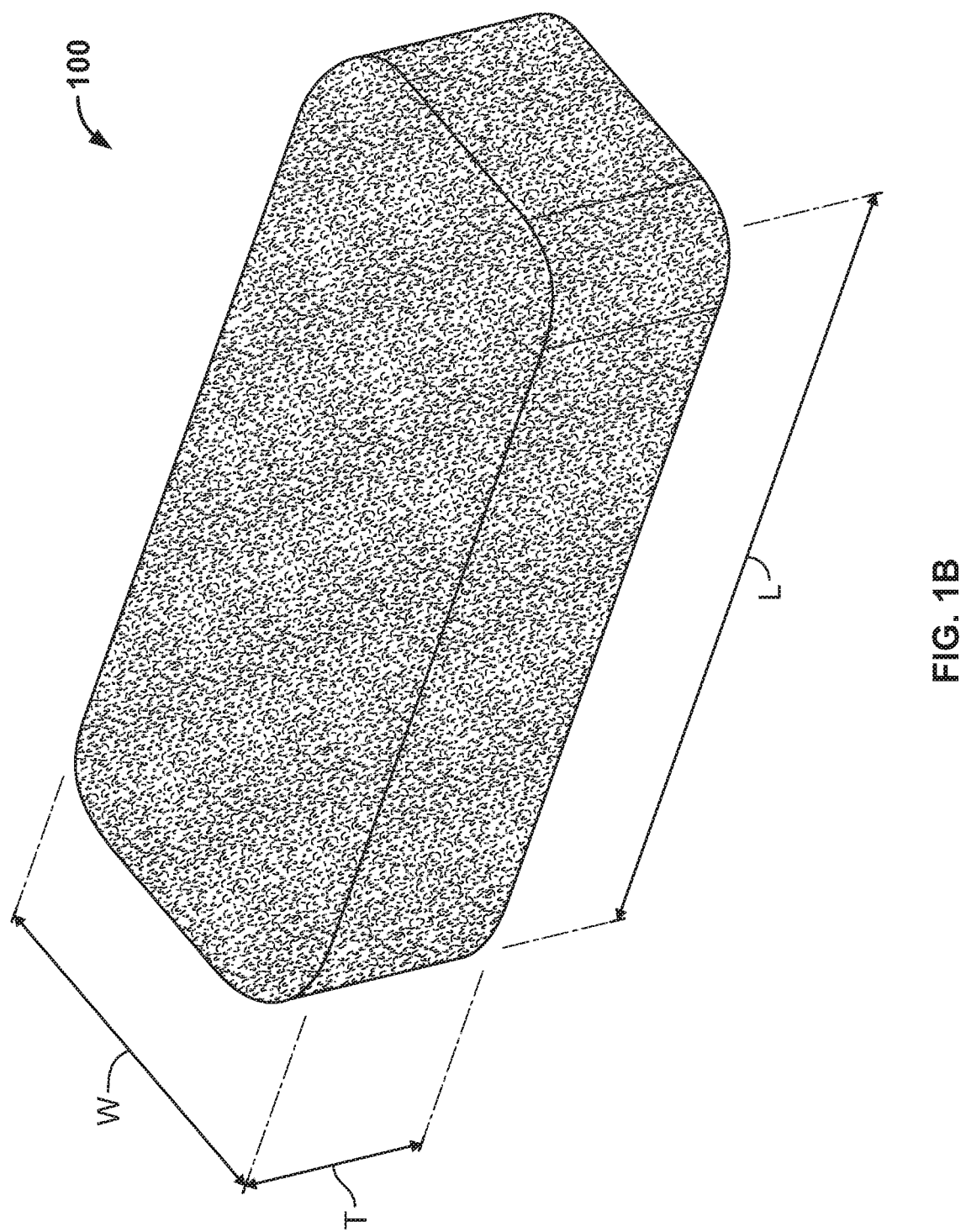
FIG. 1B depicts a perspective view of an embodiment of a fiber-wrapped smokeless tobacco product with a predetermined shape.
Figure 1C:
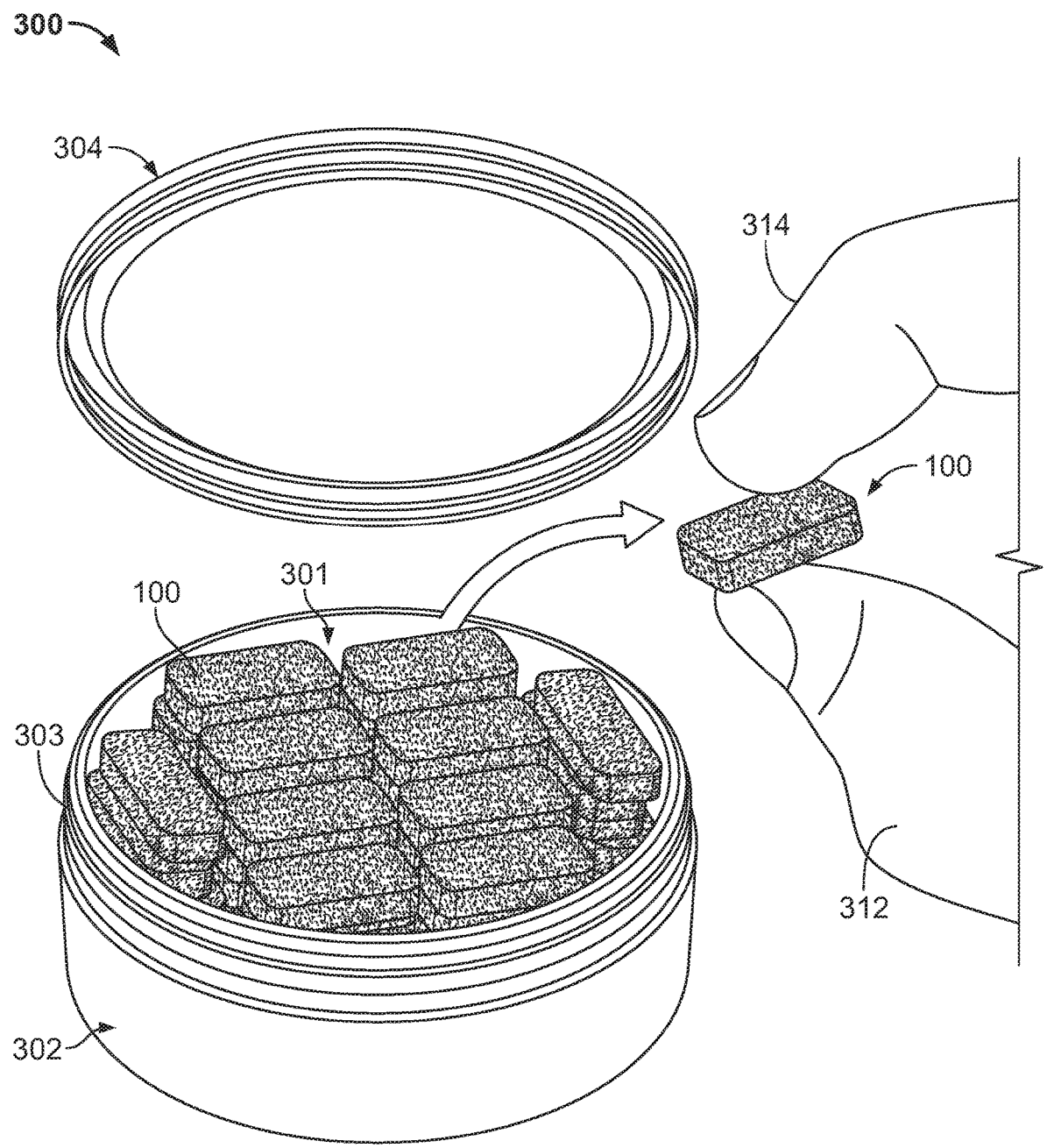
FIG. 1C depicts a substantially cylindrical container retaining a plurality of fiber-wrapped smokeless tobacco products.

An exemplary shape of a fiber-wrapped smokeless tobacco product 100 provided herein is shown in FIG. 1B. FIG. 1B depicts a perspective view of the fiber-wrapped smokeless tobacco product 100 having a substantially rectangular cuboidal shape with rounded corners in the longitudinal (lengthwise) plane. In some cases, the preformed smokeless tobacco product has a substantially rectangular cuboidal shape having a length L of between 15 mm and 50 mm, a width W of between 5 mm and 20 mm, and a thickness T of between 3 mm and 10 mm. For example, a substantially rectangular cuboidal shape could have a length L of between 26 mm and 30 mm, a width W of between 10 mm and 12 mm, and a thickness T of between 6 mm and 8 mm. A product having a length of 28 mm, a width of 11 mm, and thickness of 7 mm could have a product weight of about 2.35 g. In other embodiments, a substantially rectangular cuboidal shape could have a length L of between 18 and 21 mm, a width W of between 10 mm and 12 mm, and a thickness T of between 9 mm and 11 mm. In some cases, the preformed smokeless tobacco product 100 can be cube shaped.

A smokeless tobacco product as described herein can have a number of different configurations, e.g., can have the configuration depicted in FIG. 1B, or have a shape or a layered structure that is different from the particular embodiment of the fiber-wrapped smokeless tobacco product 100 depicted in FIG. 1B. For example, referring to FIGS. 4A-4N, the smokeless tobacco products 100 A-K can be formed in a shape that promotes improved oral positioning for the adult tobacco consumer, improved packaging characteristics, or both. In some circumstances, the fiber-wrapped smokeless tobacco product can be configured to be: (A) an elliptical shaped fiber-wrapped smokeless tobacco product 100A; (B) an elongated elliptical shaped fiber-wrapped smokeless tobacco product 100B; (C) a semi-circular fiber-wrapped smokeless tobacco product 100C; (D) a square- or rectangular-shaped fiber-wrapped smokeless tobacco product 100D; (E) a football-shaped fiber-wrapped smokeless tobacco product 100E; (F) an elongated rectangular-shaped fiber-wrapped smokeless tobacco product 100F; (G) boomerang-shaped fiber-wrapped smokeless tobacco product 100G; (H) a rounded-edge rectangular-shaped fiber-wrapped smokeless tobacco product 100H; (I) teardrop- or comma-shaped fiber-wrapped smokeless tobacco product 100I; (J) bowtie-shaped fiber-wrapped smokeless tobacco product 100J; and (K) peanut-shaped fiber-wrapped smokeless tobacco product 100K. Alternatively, the smokeless tobacco product can have different thicknesses or dimensionality, such that a beveled fiber-wrapped smokeless tobacco product (e.g., a wedge) is produced (see, for example, the melt-blown smokeless tobacco product depicted in FIG. 4L) or a hemi-spherical shape is produced.

Smokeless tobacco products can be cut or sliced longitudinally or laterally to produce a variety of smokeless tobacco compositions having different tobacco/fiber profiles. For example, the texture (e.g., softness and comfort in the mouth), taste, level of oven volatiles (e.g., moisture), flavor release profile, and overall adult tobacco consumer satisfaction of a melt-blown smokeless tobacco product will be dependent upon the number of concentration and distribution of smokeless tobacco, and the number of layers, thicknesses, and dimensions and type(s) of melt-blown polymeric fibers, all of which effects the density and integrity of the final product. Similar to previously described embodiments, the smokeless tobacco products 100A-L depicted in FIGS. 4A-L can be configured to include a predetermined portion of smokeless tobacco 105. Further, the fiber-wrapped smokeless tobacco products 100A-L can be packaged in a container 300 (FIG. 1C) along with a plurality of similarly shaped smokeless tobacco products 100A-L so that an adult tobacco consumer can conveniently select any of the similarly shaped melt-blown smokeless tobacco products therein for oral use and receive a substantially identical portion of the smokeless tobacco 105.

In addition to including flavorants within the smokeless tobacco 105, flavorants can be included at many different places in the process. For example, the melt-blown polymeric fibers can include a flavorant added to the polymeric material prior to melt-blowing. Alternatively or additionally, flavor can be applied to the smokeless tobacco product prior to being further processed (e.g., cut or punched into shapes), or flavor can be applied to the smokeless tobacco products prior to packaging. Referring to FIG. 4M, for example, some embodiments of a smokeless tobacco product 100M can be equipped with flavorants, in the form of flavor strips 116. The flavor strips 116 can be applied to the fiber wrapping 110 with exposed areas 115 therebetween.

Figure 4N:
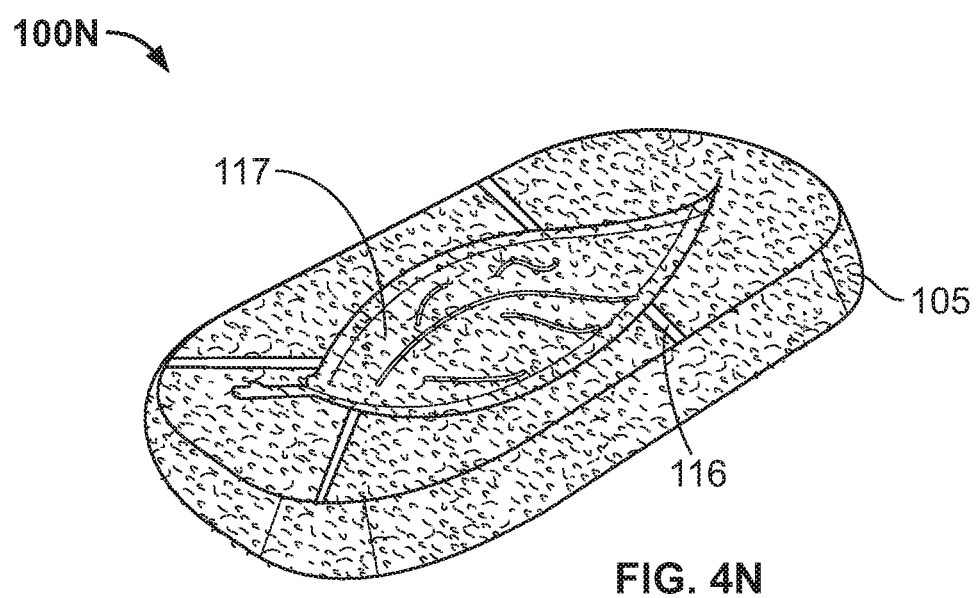

The smokeless tobacco product can be manipulated in a number of different ways. For example, as shown in FIG. 4N, particular embodiments of the smokeless tobacco product 100N can be wrapped or coated in an edible or dissolvable film. The dissolvable film can readily dissipate when the smokeless tobacco product 100N is placed in a mouth of the adult tobacco consumer. In addition, or in the alternative, some embodiments of the smokeless tobacco products can be embossed or stamped with a design (e.g., a logo, an image, a trademark, a product name, or the like). For example, a design 117 also can be embossed or stamped into those embodiments having a dissolvable film applied thereto, as illustrated in FIG. 4N.

In some cases, the fiber-wrapped smokeless tobacco product is used in combination with other tobacco and non-tobacco ingredients to form a variety of smokeless tobacco products. For example, the fiber-wrapped smokeless tobacco product can include flavor beads.

EXPERIMENTAL DATA

Figure 5:
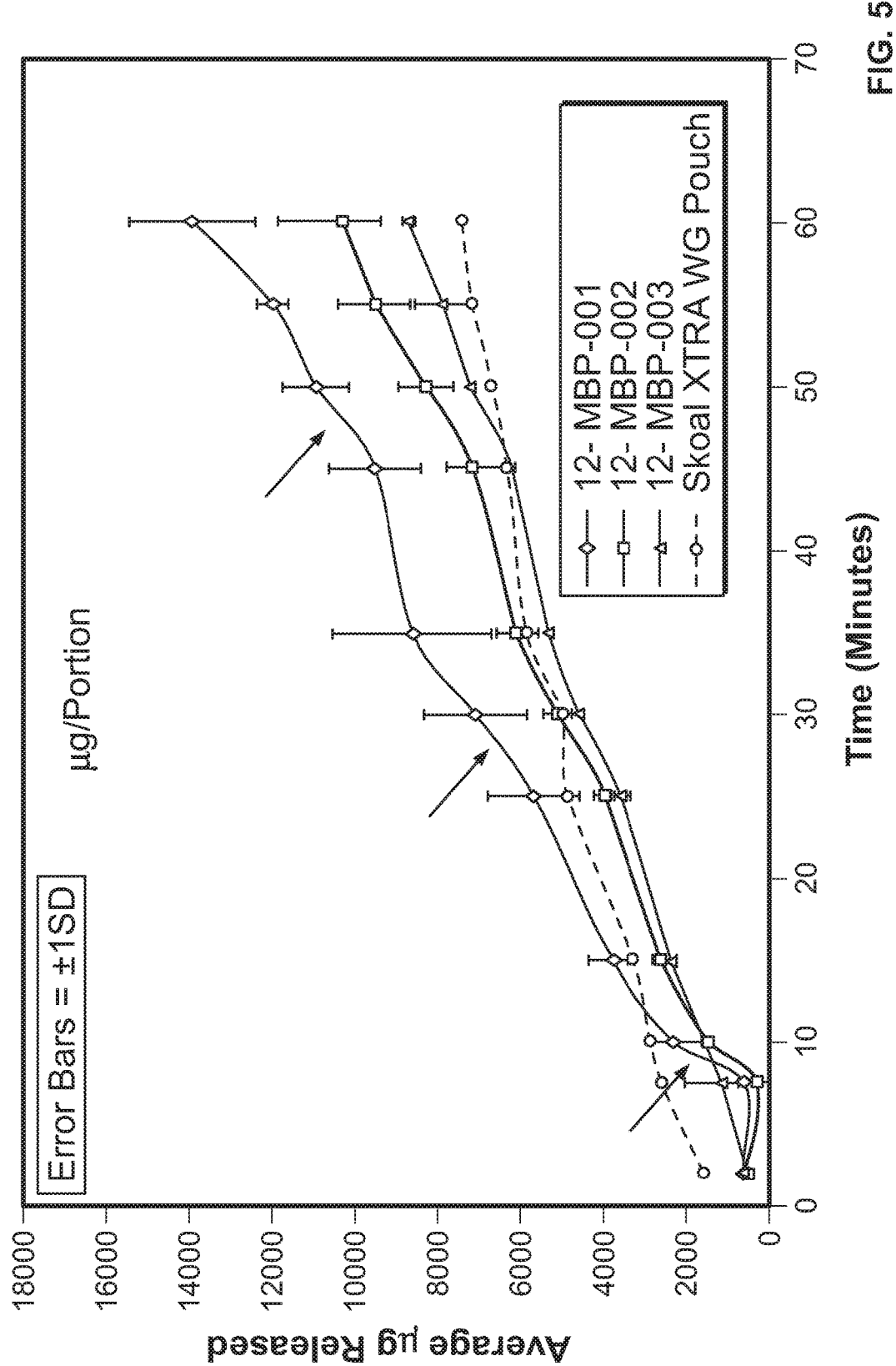
FIG. 5 is a chart showing the release pattern of methyl salicylate (i.e., wintergreen) from fiber-wrapped smokeless tobacco products and for a Skoal XTRA WG Pouch in a simulated masticator test.
Figure 6A:
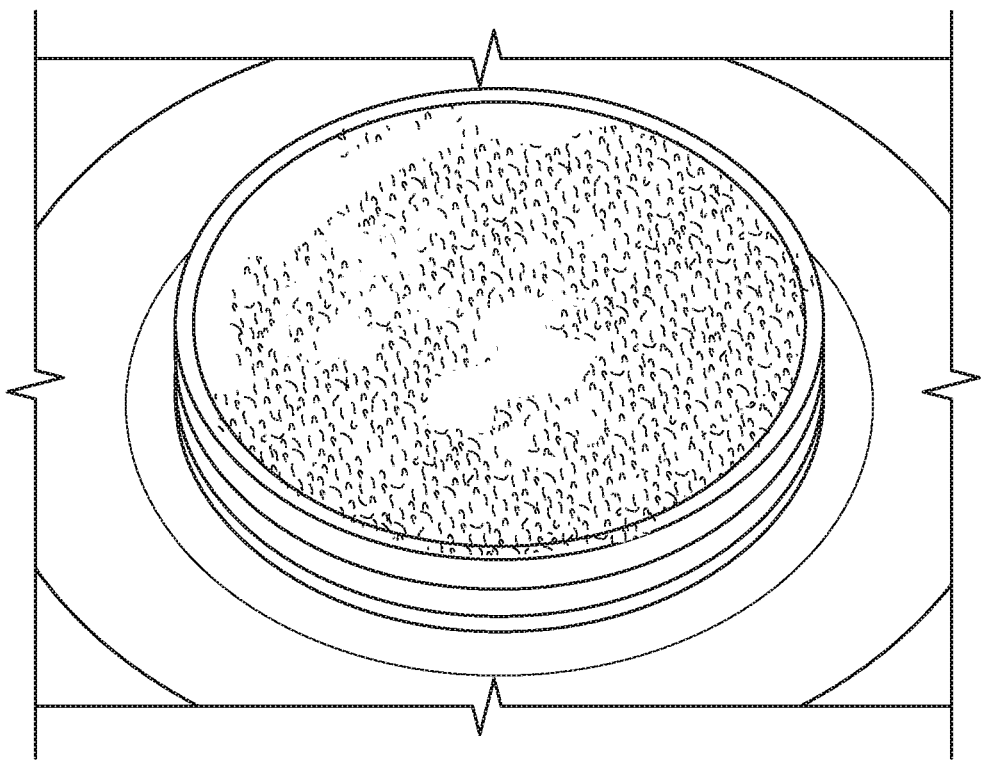
Figure 6B:
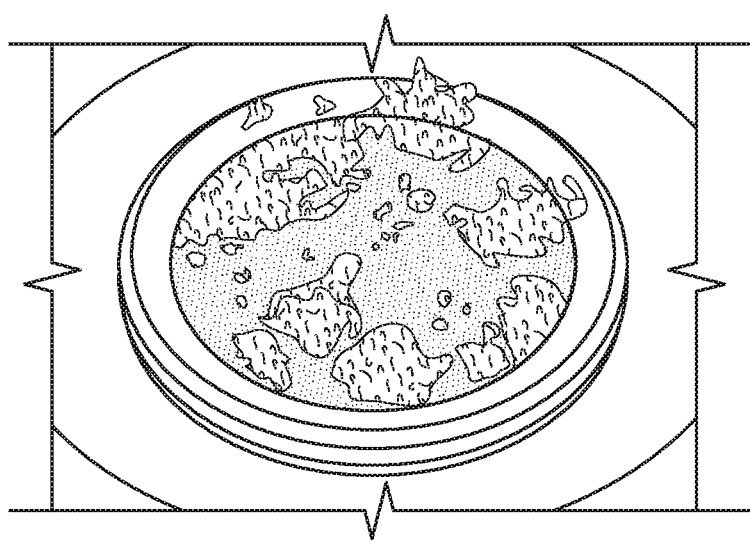

Three samples of fiber-wrapped smokeless tobacco were made by coating bodies of wintergreen (i.e., methyl salicylate) flavored smokeless tobacco with melt-blown fiber. The tobacco used was the same tobacco used in the SKOAL XTRA Wintergreen Pouch, which was also used as a control. Each sample and the control was placed into a Wennergren masticator and the amount of wintergreen (methyl salicylate) released was measured over time, as shown in FIG. 5. As shown, the control Skoal Pouch had a faster initial release of wintergreen, but had an overall lower release of wintergreen after 60 minutes. The chewing of the fiber-wrapped smokeless tobacco samples, however, demonstrated an increased release of wintergreen as compared to the control. FIGS. 6A-6C show the debris left in the masticator for each sample. FIGS. 7A-7C show the sample products after the experiment with the masticator. As shown, sample 12-MBP-001 (FIGS. 6A and 7A) lost the most mass and had a greater overall release of wintergreen. As shown, sample 12-MBP-002 (FIGS. 6B and 7B) lost some mass. As shown, sample 12-MBP-003 (FIGS. 6C and 7C) lost the least amount of mass and had a slowest overall release of wintergreen, but still achieves a greater release of wintergreen than the control. This data shows that a greater flavor release profile can be achieved with minimal mass reduction as compared to the control.

OTHER EMBODIMENTS

It is to be understood that, while the invention has been described herein in conjunction with a number of different aspects, the foregoing description of the various aspects is intended to illustrate and not limit the scope of the invention, which is defined by the scope of the appended claims. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed

What is claimed is:

1. A smokeless tobacco product comprising:
smokeless tobacco; and
a fabric surrounding the smokeless tobacco, the fabric including,
polymeric fibers having a basis weight of less than 30 grams per square meter (gsm), the polymeric fibers including,
a polymer, and
a filler, the filler being configured to increase a hydraulic permittivity of the fabric.

2. The smokeless tobacco product of claim 1, wherein the filler comprises a colorant.

3. The smokeless tobacco product of claim 2, wherein the colorant comprises a brown colorant.

4. The smokeless tobacco product of claim 1, wherein the polymer comprises a mouth-stable polymer.

5. The smokeless tobacco product of claim 4, wherein the mouth-stable polymer comprises an elastomer.

6. The smokeless tobacco product of claim 5, wherein the elastomer comprises polyurethane.

7. The smokeless tobacco product of claim 1, wherein at least a portion of the polymeric fibers have a diameter of less than 30 microns.

8. The smokeless tobacco product of claim 7, the diameter ranges from 0.5 microns to 5 microns.

9. The smokeless tobacco product of claim 7, wherein the diameter ranges from 10 nanometers to 1 micron.

10. The smokeless tobacco product of claim 1, wherein the polymeric fibers comprise melt-blown polymeric fibers.

11. The smokeless tobacco product of claim 1, wherein the basis weight is less than 25 gsm.

12. The smokeless tobacco product of claim 1, wherein the smokeless tobacco has an average length ranging from 0.1 inch to 1 inch.

13. The smokeless tobacco product of claim 1, wherein the smokeless tobacco has an average width ranging from 10 cuts per inch to 110 cuts per inch.

14. An oral product comprising:
a non-tobacco plant material; and
a fabric surrounding the non-tobacco plant material, the fabric including,
polymeric fibers having a basis weight of less than 30 grams per square meter (gsm), the polymeric fibers including,
a polymer, and
a filler, the filler being configured to increase a hydraulic permittivity of the fabric.

15. The oral product of claim 14, wherein the non-tobacco plant material comprises tea leaves, red clover, coconut flakes, mint leaves, citrus fiber, bamboo fiber, ginseng, apple, corn silk, grape leaf, basil leaf, a sub-combination thereof, or a combination thereof.

16. The oral product of claim 14, further comprising:
a tobacco extract including nicotine.

17. The oral product of claim 14, wherein the polymer comprises a mouth-stable polymer including an elastomer.

18. The oral product of claim 17, wherein the elastomer includes polyurethane.

19. The oral product of claim 14, wherein the polymeric fibers comprise melt-blown polymeric fibers.

20. The oral product of claim 14, wherein at least a portion of the polymeric fibers have diameter of less than 30 microns.

\* \* \* \* \*